(12) United States Patent
O'Neill

(10) Patent No.: US 7,616,746 B2
(45) Date of Patent: Nov. 10, 2009

(54) METHODS AND APPARATUS FOR TRACKING AND CHARGING FOR COMMUNICATIONS RESOURCE REALLOCATION

(75) Inventor: Alan O'Neill, Henley Beach (AU)

(73) Assignee: QUALCOMM Incorporated, San Diego, CA (US)

( * ) Notice: Subject to any disclaimer, the term of this patent is extended or adjusted under 35 U.S.C. 154(b) by 852 days.

(21) Appl. No.: 10/918,283

(22) Filed: Aug. 13, 2004

(65) Prior Publication Data
US 2006/0034438 A1   Feb. 16, 2006

(51) Int. Cl.
*H04M 15/00* (2006.01)
(52) U.S. Cl. .............................. 379/114.01; 379/114.07; 379/114.17; 455/405; 455/452.1
(58) Field of Classification Search ............ 379/114.01, 379/114.03, 114.05, 114.06, 114.07, 114.08, 379/114.17, 114.2, 114.28; 455/405–408, 455/450, 452.3, 452.1, 452.2; 370/329, 395.21, 370/395.41, 395.42, 431, 458; 705/52, 53
See application file for complete search history.

(56) References Cited

U.S. PATENT DOCUMENTS

| | | | |
|---|---|---|---|
| 5,251,209 A | 10/1993 | Jurkevich et al. | |
| 5,420,909 A | 5/1995 | Ng et al. | |
| 5,991,378 A | 11/1999 | Apel | |
| 6,134,226 A | 10/2000 | Reed et al. | |
| 6,160,798 A | 12/2000 | Reed et al. | |
| 6,473,500 B1 * | 10/2002 | Risafi et al. ............ | 379/144.01 |
| 6,477,150 B1 | 11/2002 | Maggenti et al. | |
| 6,487,170 B1 | 11/2002 | Chen et al. | |
| 6,498,934 B1 | 12/2002 | Muller | |
| 6,512,821 B1 | 1/2003 | Johnstone et al. | |
| 6,567,416 B1 | 5/2003 | Chuah | |
| 6,571,095 B1 | 5/2003 | Koodli | |
| 6,606,744 B1 | 8/2003 | Mikurak | |
| 6,631,122 B1 | 10/2003 | Arunachalam et al. | |
| 6,690,929 B1 | 2/2004 | Yeh | |
| 6,741,685 B1 | 5/2004 | Zanaty | |
| 7,130,807 B1 * | 10/2006 | Mikurak ........................ | 705/7 |
| 2001/0036164 A1 | 11/2001 | Kakemizu et al. | |

(Continued)

OTHER PUBLICATIONS

International Search Report for PCT/US05/25956, 3 pages, dated Sep. 15, 2006.

(Continued)

*Primary Examiner*—Quoc D Tran
(74) *Attorney, Agent, or Firm*—Micahel P. Straub; Won Tae C. Kim

(57) ABSTRACT

Utilization of resources used to provide a service, and/or costs associated with providing system resources for a service, are tracked in a system where the available resources vary depending on a variety of conditions including resource utilization by other users. The methods are well suited for systems such as mobile communications systems, where the amount of resources and/or costs to a system of providing a service are dynamic and can change on a relatively rapid time scale. Resource unitization is tracked on a per subscriber basis. Service charges can be determined as a function of both the amount of resources consumed and the amount of data delivered, with the amount of resources being used to deliver a fixed amount of data units varying as a function of environmental and/or other conditions. Service charges are sometimes determined as a function of the impact of providing the service to a first user on other system users.

36 Claims, 8 Drawing Sheets

Determination of Subscriber Dynamic cost components as a function of service delivery information and resulting Subscriber Service Cost Determination

U.S. PATENT DOCUMENTS

| | | | |
|---|---|---|---|
| 2002/0049608 | A1 | 4/2002 | Hartsell et al. |
| 2003/0007622 | A1 | 1/2003 | Kalmanek, Jr. et al. |
| 2003/0176188 | A1 | 9/2003 | O'Neill |
| 2004/0141601 | A1* | 7/2004 | Cai et al. .................. 379/114.2 |
| 2004/0174823 | A1* | 9/2004 | Steele et al. ................ 370/252 |
| 2006/0129687 | A1* | 6/2006 | Goldszmidt et al. ......... 709/229 |

OTHER PUBLICATIONS

Written opinion of the International Searching Authority for PCT/US05/25956, 3 pages, dated Sep. 15, 2006.

C. Perkins, Editor "IP Mobility Support", Network Working Group, pp. 1-79 (Oct. 1996).

IETF, Network Working Group, Request for Comments: 2205, Resource Reservation Protocol (RSVP)—Version 1 Functional Specification, pp. 1-105 (Sep. 1997).

IETF, Network Working Group, Request for Comments: 2206, RSVP Management Informatin Base Using SMIv2, pp. 1-60 (Sep. 1997).

IETF, Network Working Group, Request for Comments: 2207, RSVP Extension for IPSEC Data Flows, pp. 1-14 (Sep. 1997).

IETF, Network Working Group, Request for Comments: 2210, The Use of RSVP with IETF Integrated Services, pp. 1-31 (Sep. 1997).

IETF, Network Working Group, Request for Comments: 2208, Resource Reservation Protocol (RSVP) Version 1 Applicability Statement Some Guidelines on Deployment, pp. 1-6 (Sep. 1997).

IETF, Network Working Group, Request for Comments: 2209, Resource Reservation Protocol (RSVP)—Version 1 Message Processing Rules, pp. 1-24 (Sep. 1997).

J. Moy, Editor, "OSPF Version 2", Network Working Group, pp. 1-244 (Apr. 1998).

Andras G. Valko, "Cellular IP—A New Approach to Internet Host Mobility," ACM Computer Communication Review, vol. 29, No. 1, pp. 50-65, Jan. 1999.

TIA/EIA/IS-707A.8 "Data Service Options for Spread Spectrum Systems: Radio Link Protocol Type 2" pp. 1-1:4:12 (Mar. 1999).

Karagiannis, Mobile IP, State of the Art Report, pp. 1-63, Jul. 1999.

Elin Wedlund et al., "Mobility Support Using SIP", Proc. Of ACM/IEEE International Conference on Wireless and Mobile Multimedia (WoWMoM '99), Seattle, Washington, Aug. 1999.

Henning Schulzrinne et al., "Application-Layer Mobility Using SIP", 0-7803-7133 IEEE, pp. 29-36, Jan. 2000.

IETF Network Working Group, Request for Comments: 2961, RSVP Refresh Overhead Reduction Extensions, pp. 1-32 (Apr. 2001).

Marshall, W., et al., Integration of Resource Management and SIP, IETF Internet Draft, draft-ietf-sip-manyfolks-resource-02.txt, Aug. 2001, pp. 1-28.

Andrew T. Campbell et al., "IP Micro-Mobility Protocols", ACM Sigmobile Mobile Computer and Communication Review (MC2R), vol. 4, No. 4, pp. 34-54, Oct. 2001.

S. Zhou et al., "A Location Management Scheme for Support Mobility In Wireless IP Networks Using Session Initiation Protocol (SIP)", 1531-2216/01 IEEE, Oct. 2001, pp. 486-491.

Bos, L., et al., A Framework for End-to-End Perceived Quality of Service Negotiation, IETF Internet Draft, draft-bos-mmusic-sdpqos-framework-00.txt, Nov. 2001, pp. 1-22.

Papalilo, D., et al., Extending SIP for QoS Support www.coritel.it/publications/IP_download/papalilo-salsano-veltri.pdf, Dec. 8, 2001, pp. 1-6.

Camarillo, P., et al., Integration of Resource Management and SIP, IETF Internet Draft, draft-ietf-sip-manyfolks-resource-04.ps, Feb. 25, 2002 pp. 1-18.

Ho, Integration AAA with Mobile IPv4, Internet Draft, pp. 1-59, Apr. 2002.

"SIP: Session Initiation Protocol", IEFT Network Wording Group, Request for Comments: 3261, (Jun. 2002), pp. 1-29.

IETF, Network Working Group, Request for Comments: 3261 "SIP: Session Initiation Protocol", pp. 1-269 (printed as pp. 1-252) (Jun. 2002).

NetworkWorking Group, IPv6 Prefix Delegation Using ICMPv6, pp. 1-33, Apr. 2004.

IETF Mobile IP Working Group, "Mobility Support in IPv6", D. Johnson, Rice University, C. Perkins, Nokia Research Center, J. Arkko, Ericsson; Feb. 26, 2003, downloaded from http://www.join.uni-muenster.de on Dec. 29, 2004, pp. 1-158.

Network Working Group, "IP Mobility Support for IPv4", C. Perkins, Ed., Nokia Research Center, Jan. 2002, downloaded from http://www.ietf.org on Dec. 29, 2004, pp. 1-92.

\* cited by examiner

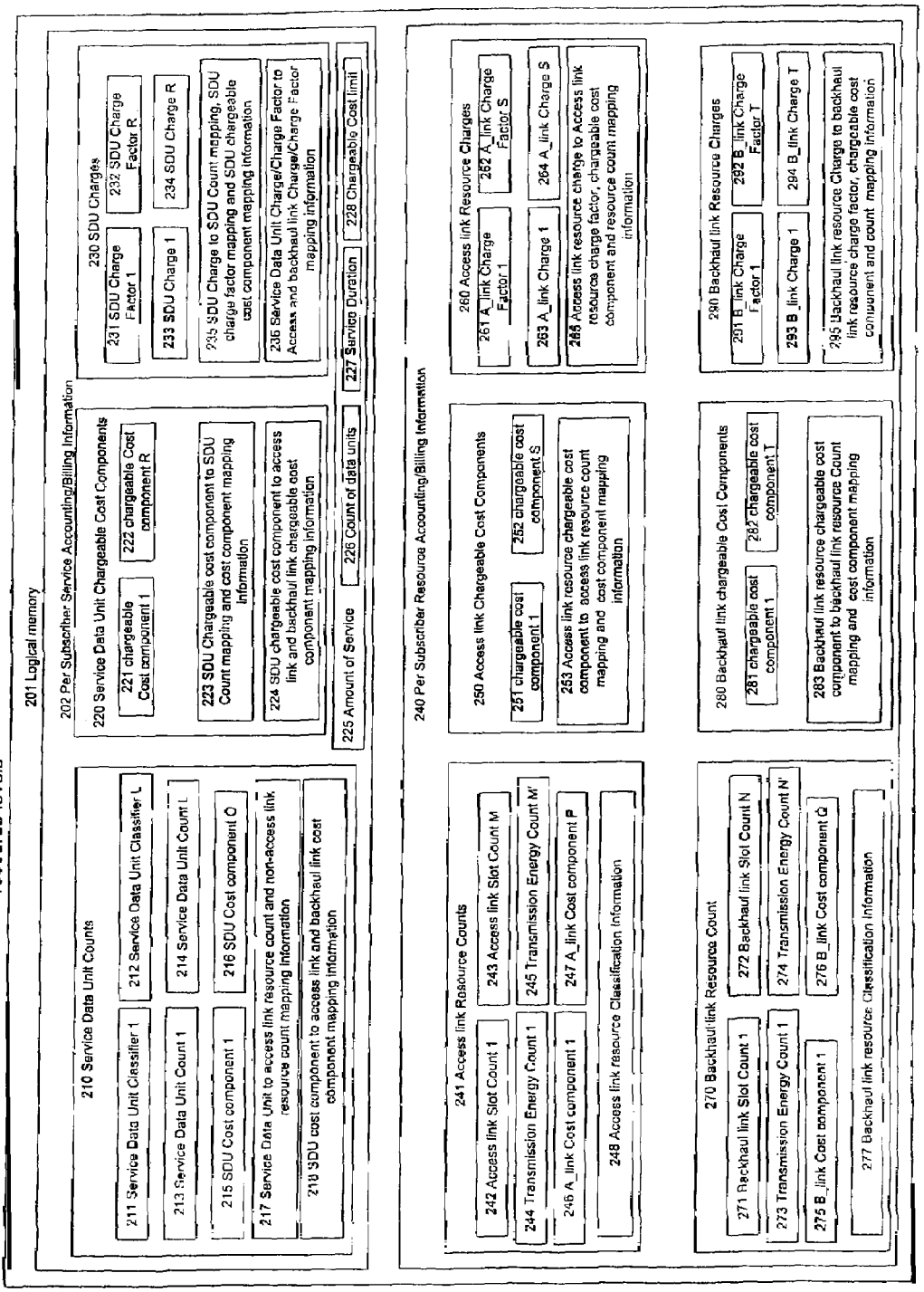
Figure 2A  Storage of Service Data Unit Counts and associated Costs/Charges at service and resource levels

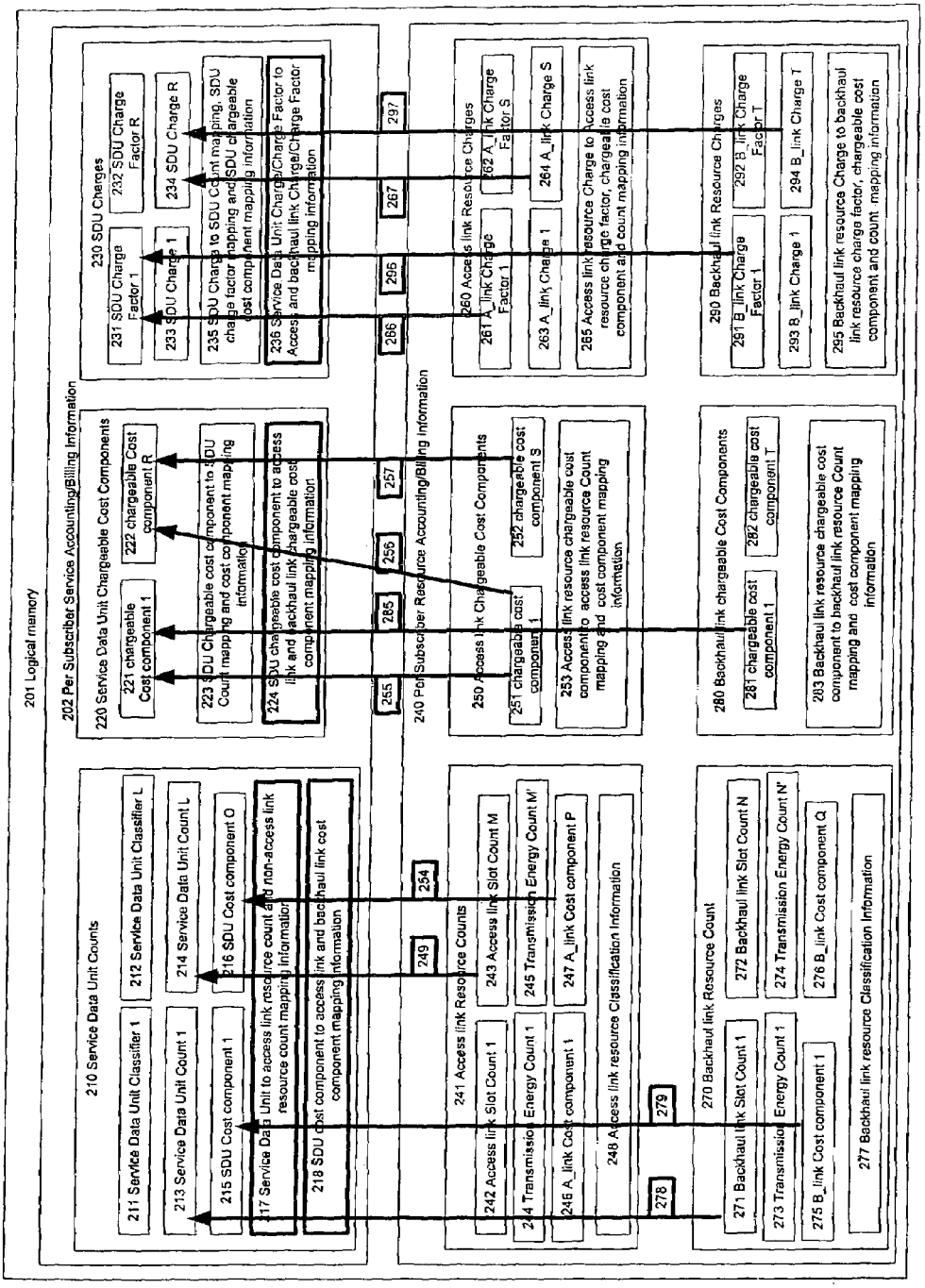
Figure 2B  Generation of service level parameters from resource parameters

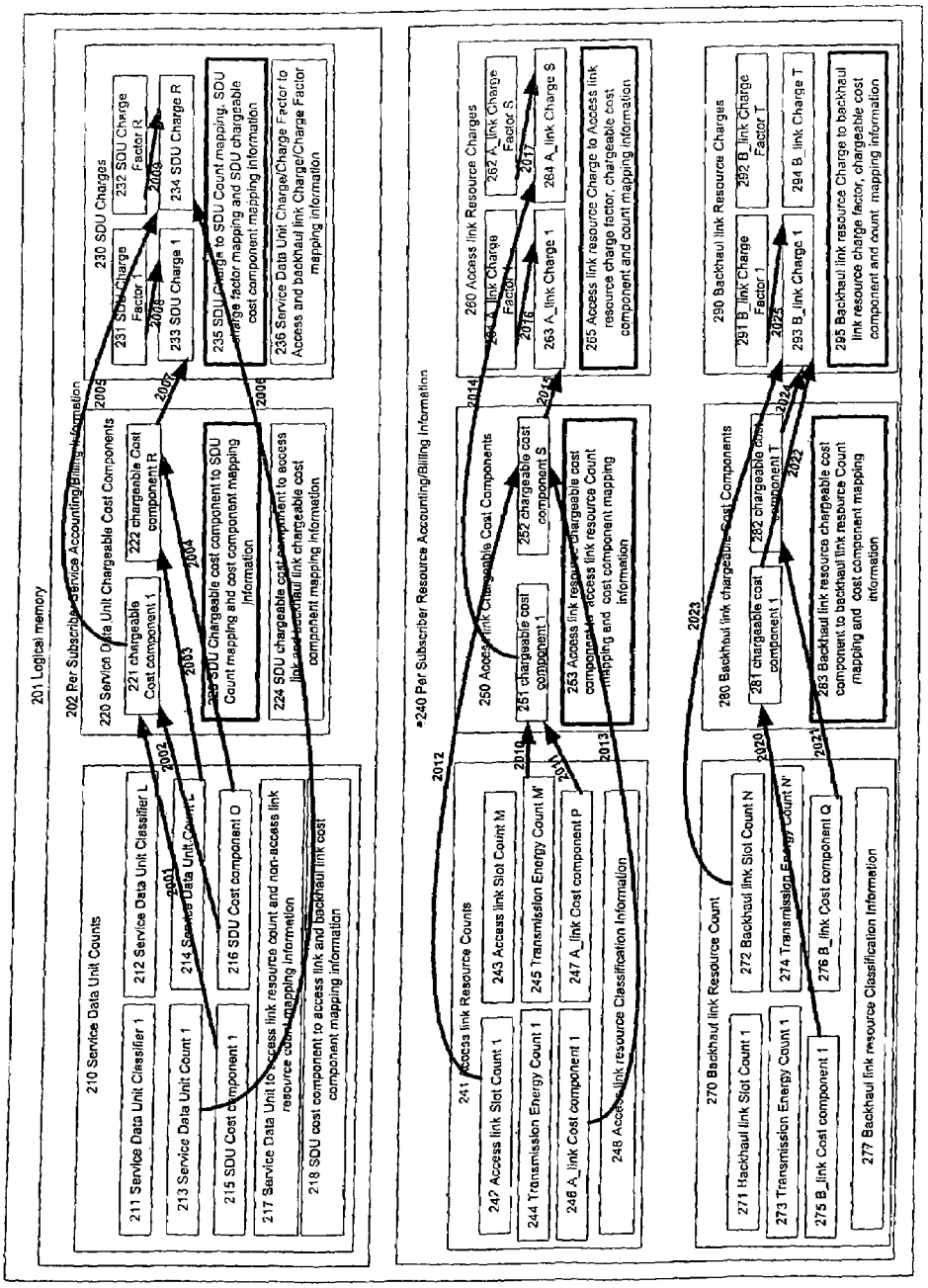
Figure 2C  Generation of Cost components and charges

Determination of Subscriber Dynamic cost components as a function of service delivery information and resulting Subscriber Service Cost Determination Borrowing Accounting Process End Node Accounting Process

METHODS AND APPARATUS FOR TRACKING AND CHARGING FOR COMMUNICATIONS RESOURCE REALLOCATION

FIELD OF THE INVENTION

The present invention relates generally to the field of communication systems and more specifically to methods and apparatus for tracking the utilization of resources and to provide a service and/or costs associated with providing system resources for a service and, optionally, generating accounting and/or billing information form the tracked resource utilization and/or cost information.

BACKGROUND

Communication links used for transmitting packets traditionally have a fixed amount of a single resource (e.g. bandwidth) available to be shared amongst competing packet flows. These packet flows are directed towards, or from, one or more end systems that are connected to an access router by said communications link. The packets are sent over the communications link in link-layer frames that may be considered to be different types of timeslots over the communications link. The communications link, and hence the timeslots over that communications link, are typically known apriori and therefore the system costs associated with the utilization of a number of timeslots is known in advance. Prior art communications links include those with multiple types of timeslots although each type of timeslot is still of a fixed size. The access router typically performs an accounting function that tracks either the number of timeslots utilized by an end system, or simply tracks the number and/or size of packets being delivered to, and received from, each end system. With a known fixed cost of timeslots, the number of data units employed by an end system, whether tracked as timeslots or packets, is sufficient for accounting purposes. Billing can then translate the accounting information into an end system bill by, for example, multiplying the number of data units by a charge per data unit. Other more sophisticated billing and accounting systems can take into the account different charging periods (e.g. dayrate v nightrate) and can also track the usage of differential service classes over the communications link bandwidth where said service classes are maintained by a scheduling algorithm, and access to service classes managed by service profiles for each end system as well as admission control algorithms for the communications link. Once again though, prior art systems track the amount of resource utilized in each service class, and the billing system translates that usage into a billable amount via a specific service class charge.

Novel communications links are being developed in which there are multiple fundamental link resources that need to be tracked, and for which the cost of the utilizing each resource can be very dynamic. Wireless links have dynamic capacities that fluctuate over time and space, with the number, location and movement of end systems in a cell, and in neighbouring cells, that are actively attempting to communicate at the same time. Wireless links have constraints on transmission levels due to battery capacity, interference generation and regulatory constraints. In addition, transmission energy also needs to be shared across multiple carriers and between communications link signaling and end system packet transport. Different transmission levels in different timeslots create different timeslot capacities. Further, different types of packets of the same size can incur very different load on the communications link. None of these, and other effects described in their application, are today tracked and fed into the accounting and billing systems. Aggregated system cost information is typically generated in the management plane, which whilst sufficient for long term dimensioning of capacity and even rough selection of charging levels for data unit transmission, is not sufficient for tracking and/or determining the dynamic cost per end system of delivered service.

SUMMARY

Utilization of resources used to provide a service and/or costs associated with providing system resources for a service are tracked in a system where the available resource varies depending on a variety of conditions including resource utilization by other users. The methods of the present invention are well suited for systems such as mobile communications systems, where the amount of resources and/or costs to a system of providing a service are dynamic and can change on a relatively rapid time scale, hence need to be tracked during service usage. The invention involves tracking resource unitization on a per subscriber basis at a level of detail beyond that tracked in systems where bandwidth and/or other systems resources are generally fixed. Service charges can be determined as a function of resources consumed, with the amount of resources being used to deliver a fixed amount of data units varying as a function of environmental conditions. Service charges are sometimes determined as a function of the impact on other system users of providing the service to a first user, e.g., in terms of interference caused and/or the effect on the system's ability to supply data to other users.

Users can be credited for pre-allocated, e.g., prepurchased, resources which are provided to other users when the user to whom the resource was preallocated does not use the resource.

Resource utilization and cost tracking information may occur in a variety of locations, e.g., in mobile nodes which are the recipient of communications services, in access nodes which communicate with mobile nodes via wireless links, and/or at other locations in the communications system. Cost and resources utilization information is maintained on a per subscriber basis and sometimes even at the more granular per subscriber per service level. Cost and resource utilization information on a per subscriber basis is communicated using an accounting communications protocol such as, e.g., Radius or Diameter, to an Accounting Server or core based node. The reported information is used for bill generation purposes in some embodiments. The reported information may be used to determine flat pricing for a service. With regard to an individual user, the reported information can be used to adjust scheduling parameters used in an access node to determine how much and when a user will be allowed to transmit and/or receive data, e.g., via a wireless link. Scheduling weights can be adjusted as a user consumes resources to keep the system costs associated with a particular user's use of resources within a level which corresponds to the amount the user has agreed to pay for a communication service.

Using the resource utilization and data delivery information tracked on a per subscriber basis, transmission scheduling priorities and/or rules can be adjusted in an access node to make sure that different users get different levels of service and that revenue which can be generated by the varying amounts of data which can be delivered in a wireless or other dynamic communications system where throughput will vary depending on a variety of conditions can be maximized and/or at least increased over systems which do not take such factors into consideration for billing purposes.

In accordance with the present invention, services can be provided where different users are billed differently for transmitting the same amount of data. Users seeking lower latency in terms of transmission delays may be charged more than users willing to accept higher latency periods. In addition, users in bad signal conditions requiring more resources than users in better conditions to deliver a fixed amount of data may be charged more for delivering the data than the users in the better signal conditions to reflect the higher system cost associated with delivering data to the user in the bad signal condition.

Users seeking particular levels of service may pay for a guaranteed amount of system resources such as bandwidth. In some embodiments of the present invention such a user can allow unused resources, which the user paid to have guaranteed, be assigned to other users. The user to whom the resource is assigned will normally be billed at a different rate for the resource obtained from the other user than for generally available resources. The user who allowed reallocation of the guaranteed resource is reimbursed in part for the reallocated resource. The system administrator by acting as a reseller of the resource can profit from the reallocation while the user who originally paid for the resource guarantee is fully or partially compensated for a resource which would otherwise go unused, In accordance with the invention, distinctions may be made between different types of data units, e.g., transmitted packets, for both billing and accounting purposes. A mobile device may report when it is receiving unwanted data units, e.g., data units that are being dropped by the units firewall. The system may use this information to drop the unwanted packets of the type being rejected by the wireless terminal prior to transmission over the wireless link leading to more efficient use of the wireless link. In some embodiments, a user is not charged for packets which are indicated as being unwanted and/or the users bill is reduced as compared to a charge for transmitting wanted packets. Different levels of billing may be used for acknowledged packets as compared unacknowledged packets and/or data units which were transmitted but not successfully received.

Users may be charged for retransmitted data units at a different rate than packets which are transmitted only once. Additional charges for repeated transmissions may reflect the system cost associated with using higher power for retransmitted data units and/or because the retransmission will interfere with the scheduling of the transmission to other users.

Given the amount of information tracked on a per subscriber/per service level in the system of the present invention, numerous billing variations are possible allowing a system to optimize the amount of revenue that can be generated even in cases where this may reduce the total system throughput, e.g., because more resources are required to transmit data units for some customers than others. Given that some customers may be willing to pay a premium to obtain a certain level of successful delivered data units in a time period even though it may have a negative impact on other users, system revenue may be increased in accordance with the invention as compared to systems where billing is not tied directly to the actual dynamic cost of delivering data and/or providing a certain amount of service.

In some embodiments users can pay to be guaranteed a certain amount of preallocated resources or to receive a predetermined portion of a pool of resources. Some users do not pay to be guaranteed a certain amount of preallocated resources and simply are granted resources, when they are available and needed, from a particular pool of resources. When a user, e.g., service subscriber, requires additional resources beyond those to subscriber is entitled as a result of preallocation or the amount of resources available from a particular pool, the user is allowed to acquire additional resources, e.g., resources which were preallocated to another user. The reallocated resources may be resources which were not going to be used by the other user or, alternatively, which have been taken away from the other user due to a service subscriber being willing to pay a premium for the resources. In some such embodiments, the reallocation of resources is tracked. A user receiving reallocated resources is charged for the reallocated resources at a rate which is higher than the rate such resources are charged at if pre-purchased or used by a user who was entitled to use the resource. In some embodiments, the user from whom the resources were reallocated is given a credit for the reallocated resources while the user receiving the resources is billed. A difference between the amount of credit and the amount billed to the user receiving the reallocated resources represents a profit to the system providing the reallocation and accounting service. The amount charged and/or credited can be a function of a priority level used in determining a service subscriber's, e.g., system user's, right to receive reallocated resources, e.g., in the case of multiple users seeking reallocation of resources. The amount of a credit in some cases depends on when a subscriber relinquishes a pre-allocated resource for reallocation to another user. For example, a resource that is relinquished early giving the system a relatively long time to find another user who can use the resource may be credited more than a user who gives relatively little time to reallocate the resource. In addition to giving credits for reallocated resources, the system may charge unused preallocated resources at a different rate than used preallocated resources. In this manner, the system can charge a premium for users who allow system resources to go to waste and/or give a discount for unused preallocated resources which go unused where there is an abundance of resources and the system administrator would like to encourage purchasing of preallocated resources to ensure a predictable minimum income stream.

In some embodiments mobile nodes are used to track resource and service utilization information and then to report the accumulated information to, e.g., the Accounting part of an Authentication Authorization Accounting (AAA) server (s). This may occur at periodic intervals. In this manner, a mobile node may roam, receive services from systems and system operators outside its usual service area which may not have connectivity to the mobile's AAA server and/or billing system, and then report the utilized services at a later date to the mobile's Accounting and/or billing system. This simplifies accounting issues and allows service providers who are not connected to one another to enter into billing and cross servicing agreements without the issues normally associated with establishing network connections between Accounting Servers of different service providers. The mobile node can reliable track many types of data. In some cases, the mobile node stored packet flow information and then collects and stores resource utilization information on a flow or group flow basis. The mobile node can request resources for a particular packet flow but then use the resources, e.g., traffic channel segments, for a different flow. The mobile node stores information indicating when resources requested for one flow are used for another flow. This information is used, in various embodiments, to adjust or control billing associated with the mobile node. The mobile node can track the different types of resource information tracked in some embodiments in the access node for billing purposes. Among the information tracked for billing purposes can be the number of packets or frames that are received by the mobile node that the mobile node does not want and discards, e.g., using a firewall. Dropped, e.g., discarded frames and/or packets, may be billed at a different rate than packets/frames which are received and used. Alternatively, the mobile node can be issued a billing credit for such frames and/or packets.

While resource use tracking and storage are described as being performed in various nodes, resource utilization information can be monitored in several locations with different sets of information being collected at the different locations, e.g., the end node may track resource utilization information not available at the access node. The resource utilization information collected at different points in the network can be communicated to a billing device, e.g., a AAA server and used in bill generation.

Numerous additional features and benefits of the present invention are discussed below in the detailed description which follows.

BRIEF DESCRIPTION OF THE FIGURES

FIG. 2A illustrates the storage of service utilization information, transmitted data unit counts, cost component information and a variety of other information which may be tracked, stored, reported and used in billing operations in accordance with various embodiments of the invention.

FIGS. 2B and 2C illustrate the relationship between various elements stored in accordance with the invention which are used to generate other elements shown in FIG. 2A.

DETAILED DESCRIPTION OF INVENTION

Figure 1:
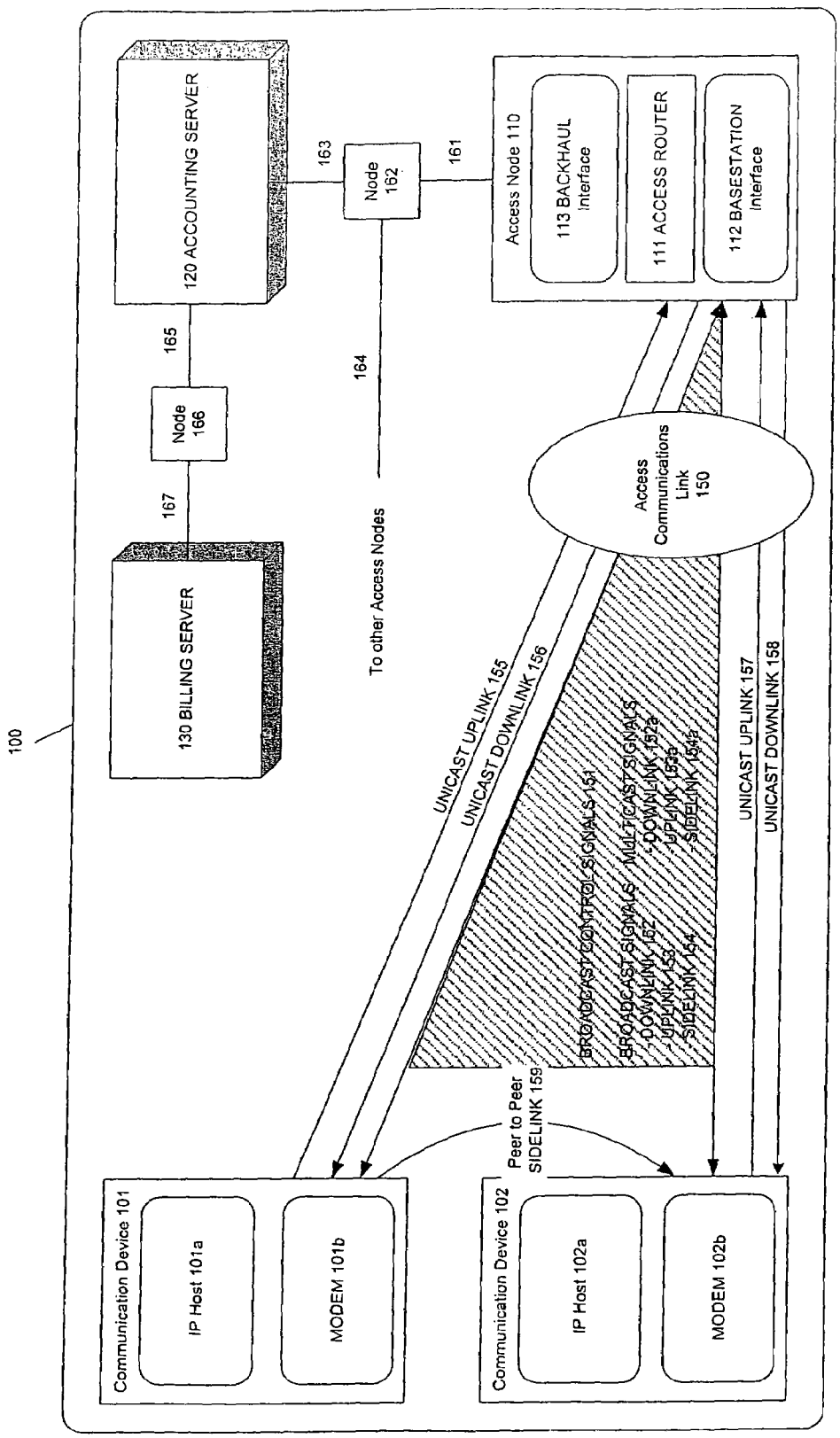
FIG. 1 is an illustration of an exemplary system, implemented in accordance with the present invention and using methods of the present invention.

FIG. 1 shows an exemplary system 100 comprising an access node 110 directly coupled to communication devices 101 and 102 via an access communications link 150. Access link 150 is subdivided into timeslots of different types where, for example, a timeslot can be defined by one or more CDMA code value(s), or one or more OFDM tones, or simply a time division of a single frequency carrier. Each timeslot may be of a single fixed length in time, may be of different lengths of time or even may be variable length in time. Access link 150 specifically includes control signals 151 in broadcast timeslots that are sent to both Communications devices 101, 102 and are used to manage the communications link, and to specifically assign timeslots of different types for the carriage of data units over the communications link 150. Access link 150 further comprises unicast, broadcast and multicast traffic timeslot types that are used to carry data units to or from one, all or a subset of all communications devices coupled to the communications link 150. Each timeslot type then has a specific direction over the communications link which may be one of uplink, downlink or sidelink. Uplink timeslots are from a communication device such as device 101 to the access node 110, whilst downlink timeslots are from the access node 110 to a communications device such as device 101. Sidelink timeslots are between communication devices such as from device 101 to device 102, without first being sent to the access node 110. The assignment of these 'peer to peer' sidelink timeslots, as well as all the other traffic timeslots, is undertaken by the access node 110 via the broadcast control signals 151.

Unicast downlink signals (156, 158) are transmitted from access node 110 to communication devices (101, 102), respectively, in unicast downlink time slots. Unicast uplink signals (155, 157) are transmitted from communication devices (101, 102), respectively, to access node 110 in unicast uplink time slots. Unicast sidelink signals 159 are communicated from a first communications device to a second communications device, e.g., from device 101 to device 102, without traversing access node 110, in unicast sidelink timeslots. Broadcast signals include (broadcast downlink signals 152, broadcast uplink signals 153, and broadcast sidelink signals 154) communicated over (broadcast downlink time slots, broadcast uplink time slots, and broadcast sidelink time slots), respectively. Similarly, multicast downlink signals include (multicast downlink signals 152a, multicast uplink signals 153a, and multicast sidelink signals 154a) communicated over (multicast downlink time slots, multicast uplink time slots, and multicast sidelink time slots), respectively. Alternatively, multicast downlink, uplink and/or sidelink signals 152a,153a,154a may be transmitted over broadcast downlink, uplink and sidelink timeslots respectively, with broadcast receivers that are not members of the multicast timeslots either ignoring those unwanted multicast timeslots or dropping the received unwanted multicast signals and associated content.

The access node 110 is coupled by a backhaul link 161 to a node 162. The backhaul link 161 similarly has communication resources such as timeslots of different types, which provide for the carriage of data units to and from the access node 110. The access node 110 has, in one exemplary embodiment, a basestation interface part 112 used to manage resources on a wireless communications link 150, an access router part 111 used to control Internet protocol packet forwarding and control signals over the access link 150, and a backhaul interface part 113 used to manage resources on a wired or wireless communications link 161. Packet operations are typically performed by the access router part 111 whilst link-layer operations are performed by the basestation part 112. Either entity, or both, in combination, can undertake the various communication processing and signaling required between the packet (e.g. Internet Protocol (IP)) layer and link-layer to enable packets to be transported over the communications link 150. Similarly, the communications devices 101,102 are, in an exemplary embodiment comprised of a modem part 101b, 102b and an IP Host part 101a, 102a. The modem deals with link-layer processing and signaling for the communications link 150 whilst the IP Host processes and provides signaling support for Internet protocol packets, although the invention is alternatively directed to other non-IP packet systems.

The network node 162 is further coupled to an accounting server 120 via link 163 and to other access nodes via link 164. The accounting server 120 is further coupled via link 165 to a network node 166 which is then coupled to a billing server 130 via a link 167. The accounting server 120 is used to collect and store accounting records from the access node 110 that indicate the number of data units communicated over the access link 150 and optionally the backhaul link 161, said data units being sent to and from each of the communication devices 101 and 102. The accounting records are generated at the access node 110 for each of the communications devices 101, 102 in the form of integer and real number counters, with one or more counters used for each communications device 101, 102. The accounting records are typically sent periodically to the accounting server 120 but can alternatively be fetched by the accounting server 120. The accounting server 120 provides usage records for the billing server 130 so that the billing server 130 can create a bill as a monetary charge that is a function of the amount of data units and the usage charge factor (i.e. tariff). A simple example would be a cost per byte charge factor that is multiplied by the number of bytes used by the communications device over some measurement interval to generate the charge for the bill.

In a first novel step, the access node 110 creates accounting records that include a chargeable cost component that is associated with the system cost of delivering an amount of service, such as the associated number of transmitted or delivered data units, for the communications device 101,102. An amount of service can alternatively be defined by a time period of service provision or a maximum amount of chargeable cost that can be incurred by the communications device before an accounting record is transmitted to the accounting server 120. In each of the cases however, a number of data units will be transmitted/delivered during the provision of the amount of service. A single chargeable cost component may be created as a summary figure for one or more data unit counts. Alternatively, a chargeable cost component may be created for each tracked number of data units. The chargeable cost component can include the amount of one or more resources that are consumed on the access link 150 and/or the backhaul link 161 during the transmission of said number and type of data units. The chargeable cost component can additionally include information on the efficiency of the use of said resources as well as information on the impact on other users of said resources being employed by a specific communications device 101,102 during a specific timeslot. The chargeable cost component can further include information that results from any uncertainty in the successful reception of said data units at the receiver, and specifically include information on data units that are not successfully received. The chargeable cost component is therefore able to track both the cost of the amount of data units transmitted as well as track any uncertainty associated with the delivery of said transmitted data units.

The billing server 130 creates a bill as a function of the amount of service such as the number of each type of data units sent, and the charge factor for that type of data units, as well as a function of the chargeable cost component associated with one or more of said type of data units.

The access node 110 includes fixed system cost component parameters and algorithms used to determine the fixed part of the chargeable cost component as a result of using resources with known fixed costs to transmit said data units, and to provide a fixed cost correction when delivery of data units is either not achieved or is uncertain.

The access node 110 includes algorithms used to determine dynamic cost components that contribute to the dynamic part of the chargeable cost components. The dynamic cost components are determined as a function of the dynamic state at the access node 110 associated with the access link 150 and/or the backhaul link 161, and the associated fixed cost components. Other sources of dynamic costs include the efficiency of the mapping between the packet layer and the link-layer timeslots. Some fixed and dynamic cost components of the access link 150, in the exemplary case of a wireless link is outlined in FIG. 3, which is discussed later. Note these dynamic cost components are typically determined and employed by prior art systems in the scheduler for the associated link. The scheduler typically uses these cost components to preferentially assign timeslots and other resources for data unit transmission when multiple transmitters are competing for the same timeslots. The cost is compared to a measure of benefit for each transmitter being selected, with the best cost/benefit metric being assigned the timeslot. These dynamic cost components are not however presently tracked at the access node 110 for a specific communications device 101,102 over some measurement interval, nor forwarded into the accounting system and subsequently used to adjust billing based on the actual system cost of service provision.

The billing server 130 uses one or more historical examples of chargeable cost component information to determine the future charge factor for a type and amount of transmitted data unit, such that future bills will better represent the cost of transmitting that type and number of data units that is known from said historical chargeable cost component information.

The access node 110, accounting server 120 and billing server 130 generates updated fixed cost components and/or algorithmic weights for the access node 110 based on one or more historical measures of dynamic cost components and some target for chargeable costs components for some measure of transmitted data units. The feedback produced into the scheduler enables the system cost of service provision to be managed by ensuring either that over some measurement period, a particular communications device will be able to incur more or less chargeable system cost for a specific amount of transmitted data units (so that the bill will better track actual cost), or a particular communications device will be able to send more or less data units when specific systems costs are present in the system (to control being scheduled and hence control the size of the bill). This is discussed further in FIG. 4.

FIG. 2A in combination with FIGS. 2B and 2C, shows the relationship between access and backhaul link resources, with access and backhaul cost components, with access and backhaul chargeable cost components and with access and backhaul charge factors and charges. The FIGS. 2A, B, C also show how these access and backhaul parameters are related to the associated parameters for transmitted service data units at the service layer. Starting with FIG. 2A, a subscriber is the billing entity associated with the user of the communication devices 101, 102 for which service data units are being provided via the access node 110. Per subscriber resource accounting/billing information 240 is stored in logical memory 201, which may be split across physical memory in the communications device 101, access node 110, accounting server 120 and billing server 130. Access link Resource Counts 241 include 1 to M counts 242,243 of different types of access link timeslots employed by the subscriber in the transmission of service data units over the access link 150. Access link resource counts 241 further include 1 to M counts 244,245 of transmission energy (or power) consumed by the transmitters on the access link 150 for the transmission of service data units. An access link 150 might include other scarce and valuable resources whose consumption needs to be tracked for accounting/billing purposes. The fixed and dynamic system costs of the consumption of these resources are stored in 1 to P A_link cost components 246,247. A_link resource classification information 248 classifies the resources employed for each data unit transmission so that the appropriate resource counts can be incremented. Access link chargeable cost components 250 include 1 to S chargeable cost components 251,252 that track a chargeable cost associated with the consumption of various access link resources 242, 243, 244, 245 for the transmission of some number of service data units. The chargeable cost component may be an average cost component per resource unit or a total cost for some number of resource units. The chargeable cost component is a function of the amount of each resource employed and the cost component associated with the use of each piece of resource, aggregated over some number of data units. The mapping between each chargeable cost component, the associated resources and cost components is stored in access link resource chargeable cost component to access link resource count mapping and cost component mapping information 253. Access link resource charges 260 include 1 to S access link charge factors 261, 262 and 1 to S access link charges 263,264. The access link charges 263,264 are a function of the associated access link charge factors 261,262 and chargeable cost components 251,252. One example would be to calculate the charge as the cost factor multiplied by the chargeable cost component. If the chargeable cost component is an chargeable cost per unit resource then the charge becomes the cost factor multiplied by both the chargeable cost component and the resource count. Information 265 stores the mapping between each charge 261,262 and the associated charge factors 263, 264, chargeable cost components 251,252 and resource counts 242,243,244,245.

Per Subscriber Resource Accounting/Billing Information 240 further includes backhaul link resource information that is equivalent to the access link resource/cost/charge information. This includes backhaul link resource counts 270 which further includes 1 to N backhaul link timeslot counts 271,272, 1 to N' transmission energy (or power) counts 273,274, 1 to Q backhaul link cost components 275,276 and backhaul link resource classification information 277. The backhaul information also includes backhaul link chargeable cost component information 280 which further includes 1 to T chargeable cost components 281,282 and backhaul link resource chargeable cost component to backhaul link resource count mapping and cost component mapping information 283. The back haul information additionally includes backhaul link resource charge information 290 which further includes 1 to T backhaul link charge factors 291,292, 1 to T backhaul link charges 293,294 and backhaul link resource charge to backhaul link resource charge factor, chargeable cost component and resource count mapping information 295.

Per subscriber service accounting and billing information 202 is further stored in logical memory 201, which may be split across physical memory in the communications device 101, access node 110, accounting server 120 and billing server 130. The Amount of service 225 defines the maximum accounting interval, which can be measured as at least one of a count of data units 226 and a service duration time 227 and a limit to chargeable costs that may be incurred 228. When the amount of service 225 has elapsed, then an accounting record is sent to the accounting server 120 which includes both the amount of service incurred (which may be less than the maximum amount due to premature disconnection by the communications device) and the associated at least one chargeable cost component that has been incurred during that amount of service limit. Service data Unit Counts 210, that are incremented during provision of the amount of service, includes 1 to L Service Data Unit classifiers 211,212 that identify service data units as matching one or more specific service class out of L service classes. Service Data Unit counters 213,214 exist for each of the L service classes and are incremented when a data unit is matched to each specific service class, generating a record of the number of transmitted data units in that class for this subscriber. Alternatively, the service data unit counts can be determined from mapping information 217. Associated with the L service classes is 1 to O Service Data Unit (SDU) cost components 215, 216 that indicate the fixed and dynamic system costs associated with the transmission of data units. These cost components can be per data unit or an aggregate value for some number of data units and can be determined from access link and backhaul link cost components 246, 247, 275, 276 based on the mapping information 218. Cost components can also be associated with the mapping cost between service data units (i.e., IP packets) and access link timeslot resources (i.e., link-layer frames) due to segmentation and reassembly overheads arising from link-layer security, variable compression gain, variable timeslot coding gain, forward error correction and error coding overheads, timeslot assignment costs, and retransmissions as a result of Automatic Repeat Request (ARQ) feedback.

SDU Chargeable Cost Components 220 include chargeable cost components 1 to R 221,222 which are determined from the cost components 215,216 to give an chargeable system cost for some number of data units of different types (i.e., matching different service classes). The determination step is controlled by information 223 which contains SDU chargeable cost component to SDU count mapping and cost component mapping information. The determination step is, alternatively or additionally controlled by information 224 which contains SDU chargeable cost component to access link and backhaul link cost component mapping information such that SDU chargeable costs can be determined directly from the access link and backhaul link chargeable cost components associated with the resources employed to transmit the data units.

SDU charge information 230 includes 1 to R SDU charge factors 231, 232 and 1 to R SDU charges 233, 234. Information 235 contains the SDU charge to SDU count mapping, SDU charge factor mapping and SDU chargeable cost component mapping information used to generate the SDU charges 233, 234 from other SDU information elements. Alternatively, or additionally, the SDU charges 233, 234 and/or the charge factors 231, 232 may be generated directly from access link and backhaul link charge/charge factor information elements using information 236 which contains the SDU charge/charge factor to access link and backhaul link charge and charge factor mapping information.

FIG. 2B illustrates how the SDU cost components, data unit counts, chargeable cost components, charge factors and charges can be generated from the equivalent resource counts maintained for the access link and non-access link (e.g., backhaul). Arrow 278 shows SDU Count 1 213 being generated from Backhaul link slot count 1 273 using mapping information 217. Arrow 279 shows SDU cost component 1 215 being generated from Backhaul link cost component 1 275 using mapping information 218. Arrow 249 shows SDU count L 214 being generated from Access link slot count M 243 using mapping information 217. Arrow 254 shows SDU cost component O 216 being generated from access link cost component P 247 using mapping information 218. Alternatively, SDU costs components can be pre-stored and generated in the service layer, along side SDU counts generated using SDU information, or a combination of service layer and resource layer information may be employed in the generation step.

Arrows 255 and 285 show that SDU chargeable cost component 1 221 is generated from a combination of access link chargeable cost component 1 251 and backhaul link chargeable cost component 1 281 using mapping information 224. Arrows 256 and 257 show that SDU chargeable cost component R 222 is generated from a combination of access link chargeable cost component 1 251 and access link chargeable cost component S 252 using mapping information 224. Alternatively, SDU chargeable cost components can be generated from a single resource layer chargeable cost component, or derived from SDU cost components as will be described in FIG. 2C.

Arrows 266 and 296 show that SDU charge factor 1 231 is generated from access link charge factor 1 261 and backhaul link charge factor 1 291 using mapping information 236. Arrows 267 and 297 show that SDU charge R is generated from access link charge S 264 and backhaul link charge T 294 using mapping information 236. SDU charge factors and charges can also be generated as a function of multiple access link or backhaul link charge factors and charges. Alternatively, SDU charge factors can be pre-stored at the service layer and SDU charges generated from this charge factor and SDU chargeable cost components as will be described for FIG. 2C.

FIG. 2C illustrates how counts, cost components and charge factors are used to generate chargeable cost components and charges for a backhaul link and/or an access link at the resource and service layers. Arrows 2001 and 2002 indicate that the SDU chargeable cost component 1 221 is generated from the SDU cost component 1 215 and SDU cost component O 216 using mapping information 223. Arrows 2003 and 2004 indicate that the SDU chargeable cost component R 222 is generated from the SDU cost component O 216 and the SDU Count L 214 using mapping information 223. Arrows 2010 and 2011 indicate that the access link chargeable cost component 1 251 is generated from the transmission energy count M' 245 and the access link cost component P 247 using mapping information 253. Arrows 2012 and 2013 indicate that the access link chargeable cost component S 252 is generated from the access link slot count 1 242 and access link cost component 1 246 using mapping information 253. Arrow 2020 indicates that backhaul link chargeable cost component 1 281 is generated from backhaul link cost component 1 275 using mapping information 283. Arrow 2021 indicates that backhaul link chargeable cost component T 282 is generated from backhaul link cost component Q 276 using mapping information 283. It is therefore shown that in various embodiments chargeable cost components are generated as a function of one or more cost components and optionally of one or more data unit or resource unit counts.

Arrows 2007 and 2008 indicate that SDU charge 1 223 is generated from SDU charge factor 1 231 and SDU chargeable cost component R 222 using mapping information 235. Arrows 2005, 2006 and 2009 indicates that SDU charge R 234 is generated from SDU chargeable cost component 1 221, SDU charge factor R 232 and SDU count 1 213 using mapping information 235. Arrows 2015 and 2016 indicate that access link charge 1 263 is generated from access link chargeable cost component S 252 and access link charge factor 1 261 using mapping information 265. Arrows 2014 and 2017 indicate that access link charge S 264 is generated from access link chargeable cost component 1 251 and access link charge factor S 262 using mapping information 265. Arrows 2022, 2023, 2024 and 2025 indicate that backhaul link charge 1 293 is generated from backhaul link chargeable cost component 1 281, backhaul chargeable cost component T 282, backhaul link slot count N 272 and backhaul link charge factor 1 291 using mapping information 295. It is therefore shown that in various embodiments that charge information is generated from one or more chargeable cost components and a charge factor, and optionally generated additionally from one or more SDU or resource counts.

It should then be further apparent that resource consumption (FIGS. 2 bottom left) can be tracked and converted into Service data unit charges (FIGS. 2 top right) using any combination of the vertical mapping processes described in FIG. 2B and the horizontal mapping processes described in FIG. 2C. These service data unit charges are then sensitive to the fixed and dynamic cost components associated with consumption of resources associated with the transmission of said service data units due to the mapping processes including the generation of the chargeable cost components. In simple scenarios, the service data unit is equal to the timeslot resource on the access link, and the backhaul link is not considered. In other more complicated embodiments, mapping functions include sophisticated algorithms that enable resources and resource costs to be mapping up to the service layer so that a realistic charge, that is sensitive to costs incurred, can be generated from accounting information that includes chargeable cost information.

Figure 6:
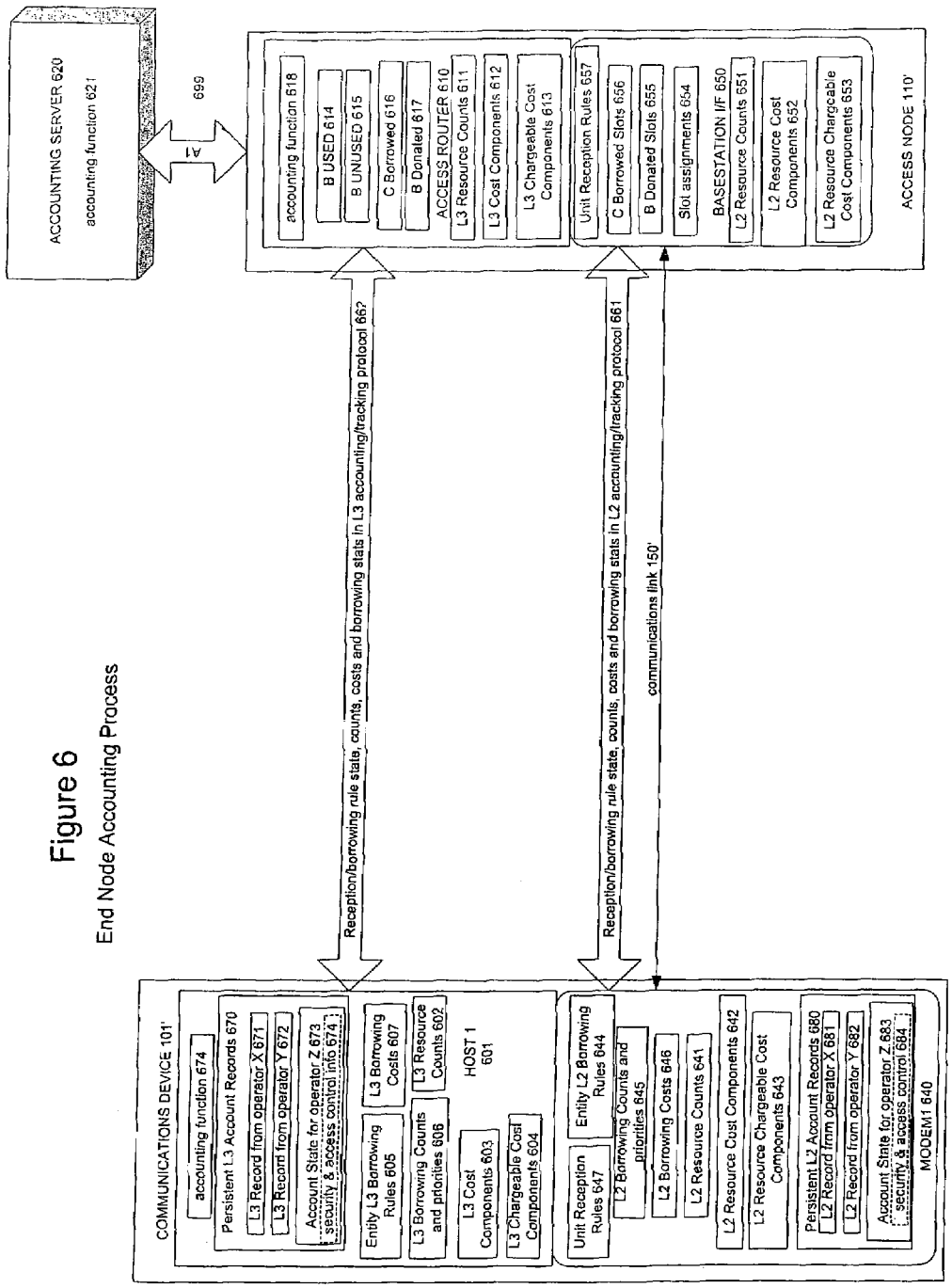
FIG. 6 illustrates an exemplary end node accounting process in accordance with the present invention.

In an exemplary embodiment, information 210, 220, 241, 250, 270 and 280 is stored in the access node 110 whilst information 260 and/or 290 is stored in the billing server 130. Information 211, 212 on transmitted data units and information 221, 222 on chargeable costs is then sent from the access node 110 via the accounting server 120 to the billing server 130 so that cost sensitive charging can be implemented. It will be apparent to those skilled in the art that other decompositions of the information may be undertaken across the various elements, resulting in different information elements being transmitted between those elements to enable the billing server 130 to create cost sensitive per subscriber bills. Another exemplary decomposition is shown in FIG. 6 and described later.

Figure 3:
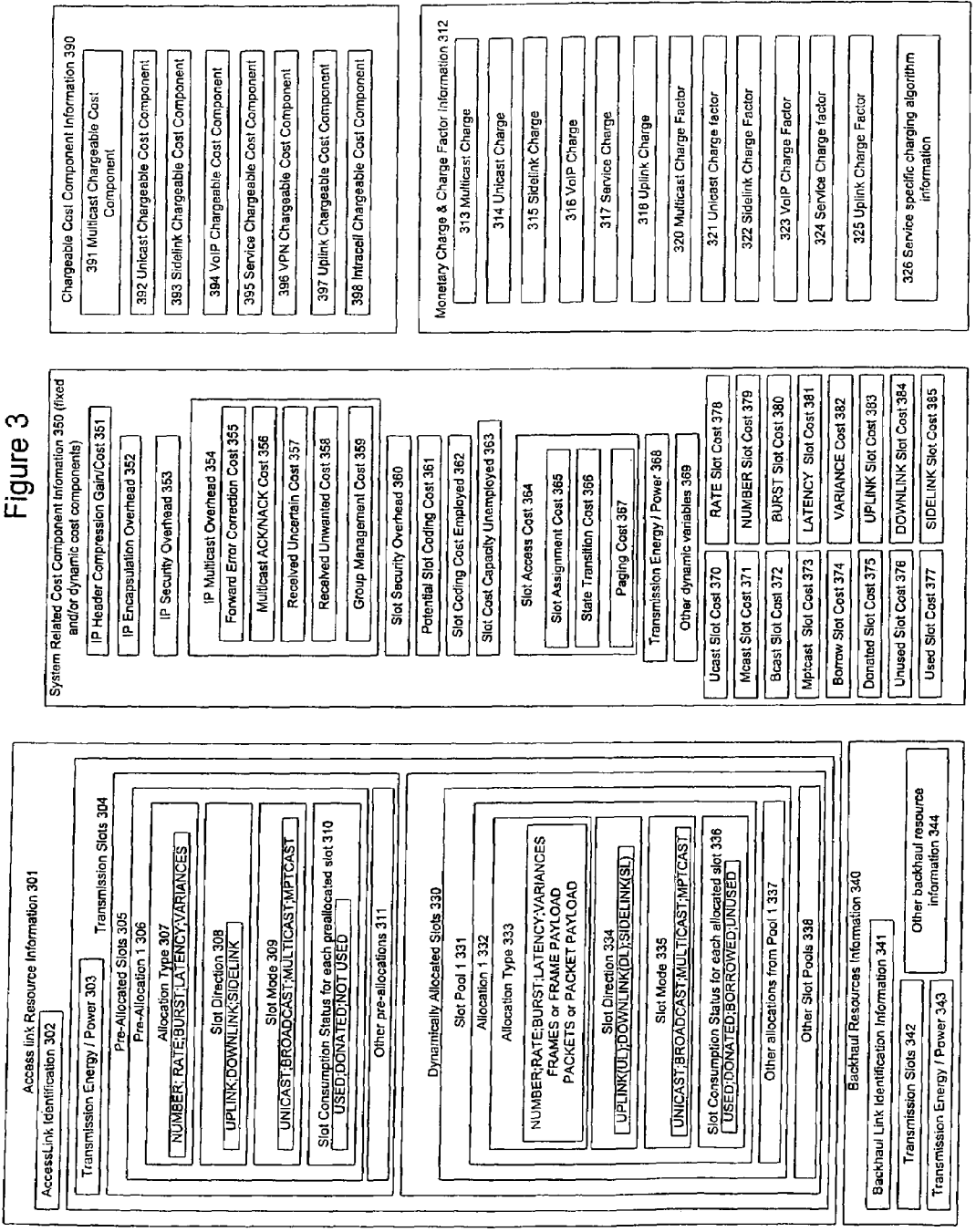
FIG. 3 illustrates various types of resource, cost and charge information which may be tracked and used in accordance with the invention.

FIG. 3 shows different types of resources and different types of fixed and dynamic cost components for an exemplary access and/or backhaul link.

The access link resource information 301 includes access link identification 302 and transmission slots 304. Each slot has a transmission energy/power 303 and is either a preallocated slot 305 or a dynamically allocated slot 330. Preallocated slots 305 are subdivided into pre-allocations such as pre-allocation 1 306 and other pre-allocations 311. Pre-allocation 1 306 includes an allocation type 307 which is at least one of a number of slots and a slot rate and a burst of slots and a latency of slots, with each type optionally including associated variances either side of target pre-allocation. The preallocation slot direction 308 can be one of uplink (from end node to access node), downlink (from access node to end node) or sidelink (from end node to end node). The preallocation slot mode 309 can be one of unicast (point to point), broadcast (all end nodes), multicast (some of all end nodes who are members of the multicast group) and MPTcast (short for multipoint which is defined here as the multicast transmission of the same data unit using multiple point to point transmission slots rather than a single multicast transmission slot). Slot consumption status for each pre-allocated slot 310 indicates whether the slot was USED to carry some portion of data unit(s), UNUSED to carry some portion of data unit(s), or DONATED by the associated subscriber for use by another subscribing as part of a slot borrowing process. An example of a pre-allocation is the set of slots required to service the latency and rate requirements of a VoIP phone call during its admission at the access node.

Dynamically allocated slots 330 are grouped into slot pools such as slot pool 1 331 and other slot pools 338. Slot pool 1 includes a dynamic allocation 1 332 and other allocations 337. Allocation 1 332 includes an allocation type 333 that can be at least one of a slot number, rate, burst, latency with associated variances and can be measured in terms of frames, frame payload, packets or packet payload. Note that the allocation type is fixed but the specific parameters for that allocation (the number and variance) has to be dynamically tracked. Allocation 1 332 includes a slot direction 334 being one of uplink, downlink or sidelink. Allocation 1 332 also includes a slot mode 335 which is one of unicast, multicast, broadcast or MPTcast. Slot consumption status for each dynamically allocated slot 336 is also tracked being one of USED, UNUSED, DONATED or BORROWED. Note that a dynamically allocated slot can be borrowed, whilst a pre-allocated slot can be donated but not borrowed into another pre-allocation because the slot has of course been pre-allocated by definition. Hence access link resource information 301 includes information on the major resources of different types that can be consumed by communications devices on communications link 150.

Backhaul Resources Information 340 includes information for the backhaul link (e.g., 161) that is equivalent to the Access link Resource Information 301 for the access link (e.g., 150). The backhaul resource information 340 includes backhaul link identification information 341 used to identify the link associated with the resource information. Transmission slots 342 provides information on the various types, direction, modes and allocation of backhaul slots as was described for access link transmission slots 304. Transmission energy/power 343 tracks the amount of energy/power used to transmit each backhaul slot, and is particularly important information for optical, and wireless backhaul links where the total amount of transmit energy/power is constrained and shared between a number of users, or where different energy/power levels create different amounts of interference for other communications devices. Other Backhaul resource information 344 represents other types of backhaul link transmission resources that may need to be tracked.

FIG. 3 also shows potential cost components associated with the use of the resources of the communications link 150. Cost components can be absolute, relative or normalized, and may be positive or negative. Cost components may also be either fixed or dynamic, depending on the nature of the communications link and the sensitivity of the system costs to changes in that cost component. A dynamic cost component may be a weighted function of other optional fixed components, can be simply dependent on measurements of dynamic real variables, or may be a function of both fixed cost components and dynamic real world variables.

System related cost component information 350 including fixed and or dynamic cost components will now be described. A specific dynamic variable is the transmission energy/power 368 for the transmitted slot. Other dynamic variables 369 include the time of day, an absolute measure of the instantaneous load on resources such as the number of communications devices wishing to be assigned a particular timeslot, the amount of interference in the cell from within the cell and from other neighboring cells, the characteristics of the radio link between the transmitter and the receiver due to said interference, and the location of, distance between, and velocity of, the transmitter and the receiver.

Fixed cost components could include the known fixed costs of the different modes of slots such as Unicast Slot Cost 370, Multicast Slot Cost 371, Broadcast Slot Cost 372, Multipoint Slot Cost 373. Fixed costs can also be associated with different types of slot allocations such as a RATE of slots 378, a NUMBER of slots 379, a BURST of Slots 380, a LATENCY associated with the delay till slot consumption 381, and a VARIANCE Cost 382 associated with the amount of tolerance between any of the RATE, NUMBER, BURST and LATENCY allocation and that actually delivered to a subscriber. Fixed costs can also be associated with different slot directions such as UPLINK slot Cost 383, DOWNLINK slot Cost 384, and SIDELINK slot cost 385. Fixed cost components can also be associated with borrowing for slots between subscribers and service classes with a USED cost 377, an UNUSED slot cost 376, a Borrowed Slot Cost 374 and DONATED slot cost 375, each of which could be, for example, a multiplier applied to the cost components associated with the type, direction and mode of the USED/UNUSED/BORROWED/DONATED slot. Compound fixed cost components can also exist which are a weighted function of multiple dependent fixed cost components. Fixed costs also include cost associated with different levels of slot security overhead 360 used to support link-layer security features such as integrity protection, authentication and/or encryption protection. Potential slot coding Cost 361 is the system cost, for at least one of the transmitter and other receivers, if the slot employs the maximum allowable transmit power (and hence coding gain) given the link characteristics, and is therefore a function of the benefit that a higher coding gain brings in terms of capacity as well as the cost of the increased interference at higher transmission powers. Slot coding cost employed 362 is the cost associated with the actual transmit power and hence coding gain and interference employed for the slot when it is consumed. The slot cost for capacity unemployed 363 tracks at least one of the cost associated with the maximum coding gain not be used for system power/interference reasons, and not be used due to insufficient data units available for transmission (e.g., in queue with sufficient credit) for that subscriber to fully utilize that coding gain, and not employing the maximum coding gain results in a drop in the instantaneous capacity of the link available to other subscribers.

Other fixed cost components could include the slot access cost 364, which could be a composite fixed component composed of the paging cost 367, which summarizes the cost of paging a subscriber that is in a sleep state, and the state transition cost 366, required to get the communications device into a state in which it can be assigned a slot, plus of course the cost of the slot assignment process 365, which includes the assignment signaling and processing costs. The slot access cost 364 could alternatively be a dynamic cost in systems in which paging and state transition costs are highly variable because for example they are dependent on the number of communication devices coupled to the link or on the quality of the radio channel to each communications device.

Various Multicast Overhead Costs 354 will now be described. Multicast and broadcast traffic may have specific additional cost components due to the fact that a portion of data unit(s) is transmitted to more than one recipient using a multicast or broadcast link-layer slot. In such systems, the communications link to reach each recipient, especially in a wireless system, may exhibit different instantaneous characteristics such that a compromise must be made in the transmission power, and hence the coding gain and generated interference for other devices. In addition, the transmitter cannot typically afford to have each multicast/broadcast receiver explicitly acknowledge reception of each multicast/broadcast slot and its data unit payload. Therefore, a Forward error correction cost 355 represents the additional cost of adding an FEC code into the slot to raise the Bit Error Rate of the multicast/broadcast slots. Alternatively, a multicast ACK/NACK signaling Cost 356 represents the cost of providing feedback from some portion of receivers to acknowledge or negatively acknowledge the reception of a set of multicast/broadcast slots. Alternatively, if reception by one or more of the multicast/broadcast receivers is neither guaranteed nor confirmed by using either FEC or NACK/ACK signaling, then an Uncertainty of Reception cost 357 is used to capture the reduction in revenue that should be associated with an uncertain delivery of data units. There is then the potential, when multiple IP multicast/broadcast groups map to the same link-layer multicast or broadcast group, for content to be delivered to communications devices that are not actually members of the IP broadcast/multicast group, as commonly occurs with IP multicast over Ethernet multicast frames for example. This creates a cost of Received Unwanted Cost 358 which captures the system cost of such transmissions, especially when one such receiver has been moved from sleep into an active state, or has to undertake significant local processing, and hence battery drain, to receive such an unwanted data unit. Finally, the group management and access control signaling associated with multicast group management, such as Internet Group Management protocol (IGMP), Multicast Listener Discovery (MLD) and multicast AAA signaling, along with any associated link-layer signaling associated with defining the mapping between multicast data units and multicast link-layer slots, brings an additional compound Group Management System Cost 359.

Next, other fixed costs are related to the more general mapping of IP packets into link-layer slots which is affected by how amenable the service data unit is to data compression over the communications link-layer, so creating an IP header compression Gain/Cost 351, how expensive the serviced data unit is in terms of the service data unit header overheads (e.g. IP in IP, L2TP, IPSEC, IP in IP in IP, IPv6 routing header etc.), so creating an IP encapsulation/extension header Cost 352 and how amenable the service data units are from a security processing perspective, so creating an IP security overhead Cost 353. For example, an encrypted data unit cannot be compressed to improve link utilization, and neither can it be analyzed by a firewall and hence could be an attack on the system. The reception of such attack or bogus packets can alternatively be tracked by the received Unwanted Cost 358 as a result of feedback from the communications device service processes.

These various fixed cost components are examples of any parameter that a service provider might wish to track if it is important for determining the cost and hence the charge for the service provided such as the transport of a number of data units over the communications link. Note also that whilst these costs have been described as fixed, they can equally be dynamic cost components when that makes sense given the characteristics of the associated communications link and communications devices.

The use of a specific type of resource, or combination of resources, following a scheduling decision will result in the determination of a total dynamic cost component, called the chargeable cost component, which is associated with that resource usage. This chargeable cost component may therefore be a weighted and/or threshold (i.e., a cost incurred if above a certain limit value) function of one or more fixed and dynamic cost components (of resources or associated processes) and/or dynamic variables associated with the communications link 150. This chargeable cost component may be maintained over a number of scheduling decisions using some aggregation function, and hence produce a chargeable cost component for some amount of service delivered, such as some number of transmitted data units. Examples of chargeable cost components are given in Chargeable cost component information 390 and includes a Multicast chargeable cost component 391 aggregating each of the costs associated with delivery of multicast packets for a subscriber over some period of time or count of multicast data units. Similarly, Unicast Chargeable Cost Component 392 aggregates the costs associated with the delivery of Unicast data units for a subscriber; Sidelink Chargeable Cost Component 393 aggregates the costs associated with the delivery of sidelink data units and specifically does not include costs associated with forwarding via the access node 110 or the backhaul link. Intra-cell chargeable cost component 398 aggregates the costs associated with communications between end nodes on the same communications link, that does not employ sidelink slots and hence does include cost associated with forwarding via their access node 110 (i.e., a downlink plus an uplink) but does not include backhaul costs. Uplink Chargeable Cost component 397 aggregates the costs associated with the transmission of uplink service data units which can be critical for wireless and other broadband systems (e.g. ADSL) which have a very expensive (i.e., lower capacity, lower performance) uplink compared to the downlink and when the service is primarily charged on the basis of primarily downlink packet delivery (i.e., no servers at the end node 101, 102). A generic Service Chargeable Cost Component 395 aggregates the costs associated with the delivery of an arbitrary service defined by a service data unit classifier 212. VoIP Chargeable Cost Component 394 aggregates the cost associated with the delivery of VoIP calls, including for example session signaling and media packets and including up-link, downlink unicast and multicast cost components. Virtual Private Network (VPN) Chargeable Cost Component 396 aggregates the costs associated with the transmission of packets in a VPN tunnel, potentially including encryption, over a backhaul and an access link.

The chargeable cost component and the associated amount of service delivered, such as the number of transmitted service data units, can then be sent to the accounting server 120 so that the accounting and/or billing server 130 can next determine either a chargeable cost dependent subscriber bill, or provide adjustment to its charges per data unit to reflect the communicated ongoing, and historically stored, chargeable costs. The service charge is a function of the chargeable cost component and the associated charge factor, such that the amount of resource employed is included in the chargeable cost component, and for example could be;

Charge=charge factor×chargeable cost component.

Alternatively, the chargeable cost component could be an averaged cost per data unit transmitted or delivered and hence a function of the number of data units communicated to the accounting server 120, which for example could be;

Charge=charge factor ×chargeable cost component× no. data units.

A third example, could be where the chargeable cost component tracks chargeable costs below and above a normalized target chargeable cost, so for example;

Charge=charge factor×no. of data units×(1+chargeable cost component)

Such that when the cost incurred are the target costs then the charge is simply the charge factor×no. of data units but the charge decreases and increases as the chargeable cost deviates away from the target cost. In another, more general example, the charge dependency on the deviation away from the target chargeable cost component can be tuned using different types of function of the chargeable cost component deviation from the target chargeable cost component, for example, Charge=charge factor×no. of data units×Function (chargeable cost component)

Examples of charge and charge factors are shown in Monetary charge and charge factor information 312 which further includes Service specific charging algorithm information 326 which defines the algorithms and inputs to be used for generating charges. If the algorithm relies on the number of data units transmitted or received, as a charge generation input, then these are stored in counters such as SDU Count L 214 which is associated with the pre-allocated or dynamically allocated resource information 307, 333. Multicast Charge 313 is generated from at least the Multicast Charge factor 320 and the Multicast Chargeable Cost Component 391. Unicast Charge 314 is generated from at least the Unicast Charge Factor 321 and the Unicast Chargeable Cost Component 392. Sidelink charge 315 is generated from at least the Sidelink Charge factor 322 and the Sidelink Chargeable Cost Component 393. Uplink Charge 318 is generated from at least the Uplink Charge factor 325 and the Uplink chargeable Cost Component 397. VoIP charge 316 is generated from at least the VoIP charge factor 323 and the VoIP chargeable cost component 394. A general Service Charge 317 is generated from at least the Service Charge factor 324. It could further be generated from either a general Service Chargeable Cost Component 395, or from a weighted combination of other Chargeable cost components such as Uplink Chargeable cost component 397, Unicast Chargeable Cost Component 392 and Multicast Chargeable Cost component 391.

Figure 4:
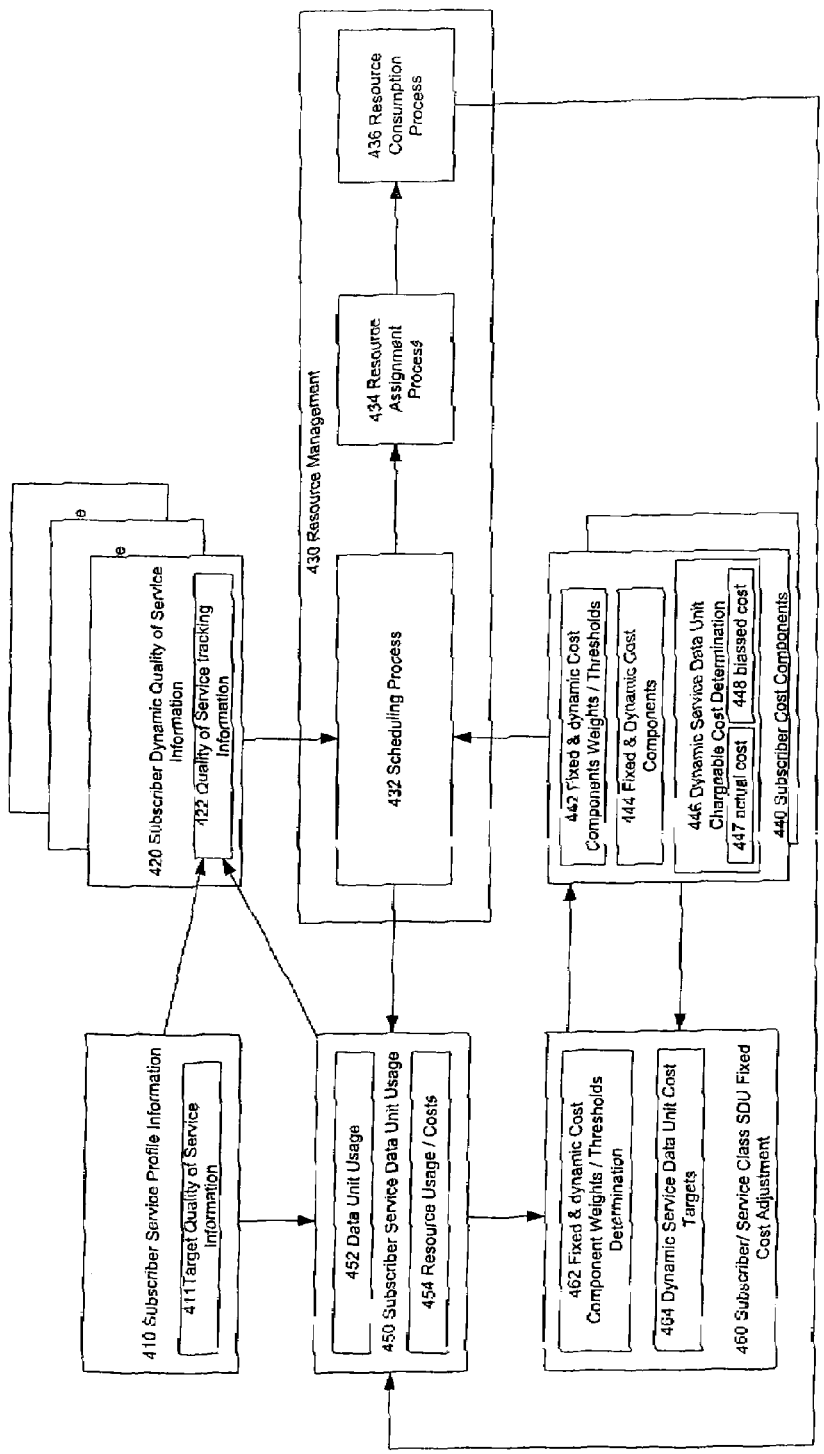
FIG. 4 illustrates an exemplary method of generating and using various resource utilization, cost component and other types of values relating to tracking and utilization of services in the system of FIG. 1 in accordance with the invention.

FIG. 4 shows a feedback system for adjusting fixed cost components and hence both dynamic and chargeable cost components as a function of previous dynamic cost component values and either target dynamic cost component or target chargeable cost component values. Subscriber Service profile Information 410 includes target quality of service information 411 for the subscribers service to be provided over a communications link 150. The Subscriber Dynamic Quality of Service Information 420 manages the quality of service delivered to the subscriber over the communications link and specifically includes Quality of Service tracking information 422. Resource management 430 includes a scheduling process 432 that attempts to meet the often competing Quality of Service targets for multiple subscribers coupled to the communications link 150. The scheduling process provides scheduling decisions to the Resource assignment process 434 so that signaling can be performed over the communications link 150 to inform a communications device 101, 102 that it has been assigned a specific timeslot for communications. The timeslot is then employed for communications associated with the assigned communications device and the results of the resource consumption collected in Resource Consumption Process 436. Specifically any cost information associated with consumption (including utilization of resources employed and data units carried) is transferred to Subscriber Service Data Unit Usage 450 to be stored in Resource usage/costs 454 and Data Unit Usage 452. The amount, rate and capacity of timeslots scheduled by the scheduler is sent to Subscriber Service Data Usage 450 and also stored in Resource Usage/Costs 454 so that resources assigned, but either not consumed or consumed inefficiently, can be tracked. Information in Subscriber Service Data Unit Usage 450 on the resources provided and the data units transmitted is sent to Subscriber Dynamic Quality of Service information 420 which is processed and stored in Dynamic Quality of Service tracking information 422. The scheduling process 432 has two main inputs into its scheduling decisions. The first is Quality of service tracking information 422 which is based on some measure of the difference between the target quality of service information 411 and the delivered quality of service for each subscriber, which translates into a ranking of subscribers in terms of the benefit of them being scheduled in the next timeslot. The second main input is a subscriber specific system dynamic cost component which ranks the system cost of each subscriber being scheduled given the fixed and dynamic cost components 444 and the fixed and dynamic cost component weights and thresholds 442 that contribute to the dynamic SDU Chargeable Cost Determination 446 in the Subscriber Cost Components 440, associated with system resources that would be needed when consuming a timeslot. The dynamic SDU Chargeable Cost Determination 446 is typically some weighted or threshold function of fixed and dynamic cost components 444, such as one or more of those included in system related Cost component information 350, as well as a function of real world dynamic variables 368,369 that track the real-time properties of the communications link such as the physical radio environment, the number of subscribers communication devices competing for resources and the offered load on the communications link from those devices. Example chargeable cost components are shown included within chargeable cost component information 390, such as multicast chargeable cost component 391.

In such a described system, the scheduler would undertake a cost/benefit analysis across the subscribers to identify the optimum subscriber to be scheduled next (most benefit at least cost). In an exemplary embodiment, the cost determination for the scheduler, for each scheduled subscriber, is included into the chargeable cost component using some form of aggregation function, to track the chargeable cost over some service measurement interval. However, the scheduler is not capable of either adjusting the Dynamic Quality of Service targets 422, 411 for a subscriber to stay within a specific Chargeable cost target for some number of data units or some period of time, nor is it capable of maintaining the system cost of delivering data units that match a specific service class, across a multitude of subscribers, within some cost target over some number of data units or some period of time.

In a further novel part of the invention, the system further includes a Subscriber/Service Class SDU Fixed Cost Adjustment 460 which further includes a Fixed & Dynamic Cost Component Weight/Threshold Determination 462 and Dynamic Service Data Unit Cost Targets 464. The fixed and dynamic cost components 444, or simply the resulting chargeable SDU cost component 447 associated with each scheduling decision, for a specific subscriber or service class, is passed from Subscriber Cost Components 440 to Subscriber/Service Class SDU Fixed Cost adjustment 460. The incurred cost/costs is then compared to the Cost targets in Dynamic SDU Chargeable Cost Determination 464 and used to adjust the Fixed & dynamic cost component weights and thresholds 462 which are then passed back to Fixed and Dynamic Cost Components Weights/thresholds 442 in Subscriber Cost Components 440. For a subscriber or service class that has been recently scheduled at above average system cost, the objective is to reduce the probability of a subscriber or service class being scheduled by opportunistically raising the fixed & dynamic costs components 444 contribution to the chargeable cost component 446, so creating a biased chargeable cost component 448 which is then employed by the scheduler in its cost/benefit analysis. This biased cost is then higher relative to other subscribers for the same physical system conditions and hence the subscriber/service class is less likely to be scheduled, and when scheduled, the actual system cost 447 (minus the weighting changes) is stored for future comparisons in Fixed & dynamic Cost Component Weights/Thresholds Determination 462. For a radio system, the subscriber would then need to be in a better than average radio environment (short link, low interference) to receive an average allocation of timeslots and hence is scheduled at a lower system cost than average so reducing its long term cost of service. Equivalently, if a subscriber or service class has been operating at lower than average cost for some period then it obtains a kind of cost credit that would enable it to maintain an average proportion of scheduled timeslots even when in below average radio environment (and hence above average system cost) by temporarily reducing its chargeable cost component in the schedulers cost/benefit analysis. In summary, by tracking the chargeable cost components incurred 447, and comparing them to a target chargeable cost component 464 for a subscriber or service class, the fixed and dynamic cost components 444 can be adjusted (via weights and threshold values 442) to create a biased chargeable cost component 448 for the schedulers cost/benefit analysis so that a subscriber can be made more or less likely to be scheduled compared to the actual chargeable cost component 447 and those actual chargeable cost components of other subscribers/service classes competing for the next timeslot. The actual chargeable cost component 447 is then tracked into the accounting system 120 so that true revenue levels are maintained through the previously described cost dependent accounting system.

Whilst the invention has been described in terms of the transmission of a number of service units to the accounting server, the interval between accounting reports, and the contents of those reports in terms of the amount of service delivered, can use alternative information. The period between accounting reports could be based on a fixed time period, a fixed amount of incurred cost or be triggered by a system event such as the communications device 101, 102 leaving the communications link 150. The amount of service reported could be the time period for which a communications device 101, 102 has been coupled to the access node 110, it could be a number of application level units such as the number of VoIP calls or number of electronic messages (e-mail, SMS, MMS) employed by a communications device. The amount of service could finally be simply the transmission of information indicating the expiry of some form of pre-paid or credit limit stored in the access node for the associated communications device.

Figure 5:
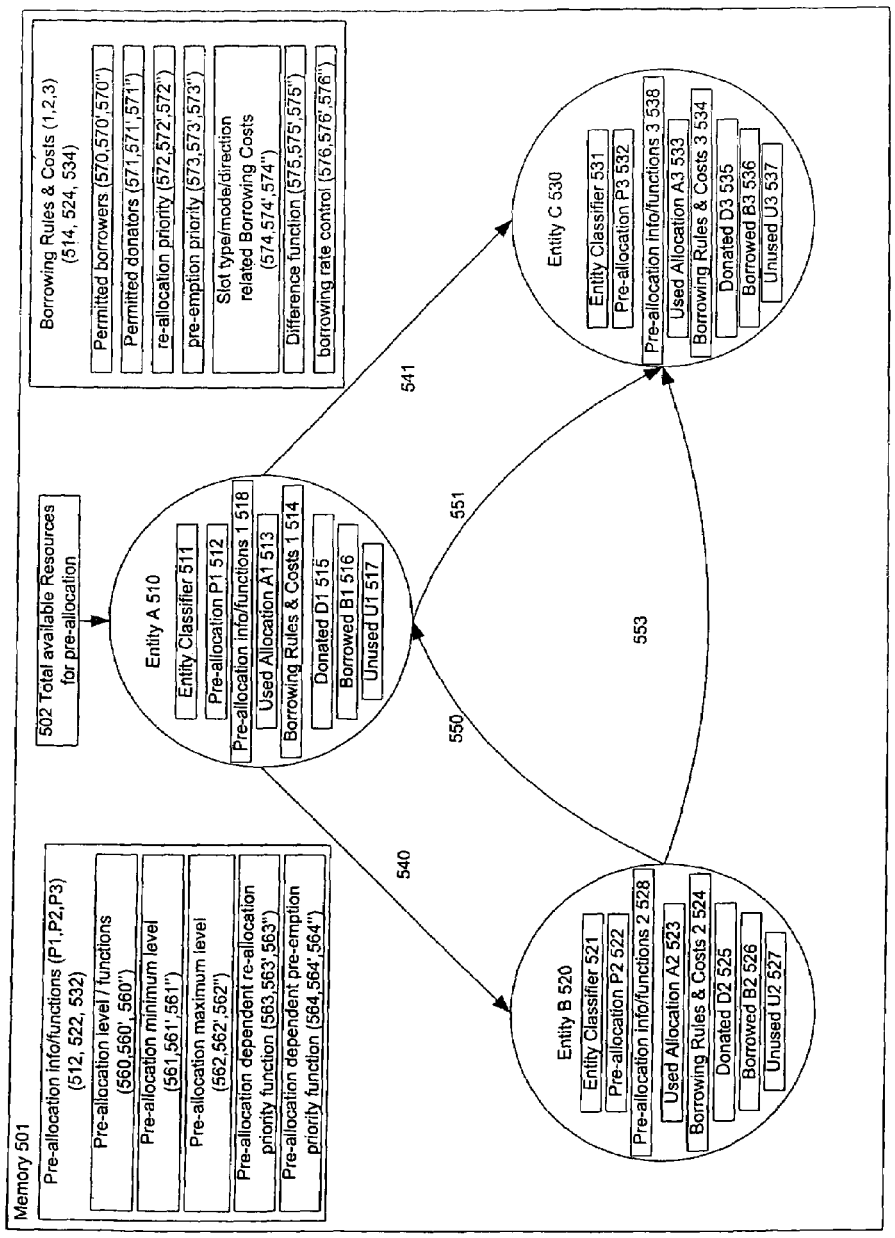
FIG. 5 illustrates an exemplary method of allocating, reallocating and charging for resources which can be shifted, e.g., borrowed by one user, and hence donated from another user who either does not need the resource or is not willing to pay as much for a particular resource as the user to whom the resource is finally allocated.

FIG. 5 illustrates an exemplary specific type of resource management function whereby timeslots, service data units or some other resource consuming metric is subdivided across a number of service classes and/or subscribers, which are generically identified as resource management entities in FIG. 5 that are stored in memory 501. Each entity, in the specific case of timeslot resources, has a pre-allocation of a number or proportion of slots out of the total available resources for pre-allocation 502, which it either consumes itself (as the parent entity) or donates down to a dependent (or child) entity in the entity hierarchy. For example, entity A 510 has a pre-allocation P1 512 which is subdivided to entity B 520 (via arrow 540) and entity C 530 (via arrow 541), which then have pre-allocations P2 522 and P3 532 respectively. Each entity (A 510, B 520, C 530) also includes pre-allocation information/functions (518, 528, 538) used to obtain pre-allocations (P1 512, P2 522, P3 532). Entity A 510 could represent a pre-allocation to a service class such as HTTP traffic, that matches the entity A classifier 511, with Entities B and C representing allocations for communications devices 101, 102 on the communications link 150. Traffic for entity B 520 and entity C 530 is recognized by its entity classifier 521, 531. Entities B 520 and C 530 can hence consume P2 522 and P3 532 proportions of slots for their own HTTP traffic. Now out of the pre-allocations P1 512, P2 522, P3 532 to each entity, some number or proportion of slots might be Unused over some interval due to insufficient HTTP traffic for each entity that matches that entities classifier. These slots are unused by any entity, and each entity therefore shows an Unused pre-allocation U1 517, U2 527 and U3 537. Additionally out of the pre-allocations P1 512, P2 522, P3 532, some slots are spare for the pre-allocated entity but can be used by another entity through a slot borrowing process. These spare slots are therefore donated to the borrowing entity entities, when those entities have traffic to service that is greater than their pre-allocation. The borrowing of slots is controlled by borrowing rules & costs 1 514, 2 524, 3 534. The borrowing rules (514, 524, 534) for example assign a borrowing priority to each entity such as reallocation priority (572, 572', 572") and/or a maximum rate of borrowing as defined by borrowing rate control (576, 576', 576") and/or a limit from which entities slots may be borrowed or to whom slots may be donated such as permitted borrowers (570, 570', 570") and permitted donators (571, 571', 571"). The borrowing rules (514, 524, 534) can further include a pre-emption priority (573, 573', 573") which enables a higher pre-emption priority first entity to borrow resources from a lower pre-emption priority second entity even when that second entity is able to utilize its pre-allocation (i.e., the preallocation is not spare). The total available resources for pre-allocation 502 can vary as a function of the physical conditions on the link. The pre-allocations for specific entities (P1 512, P2 522, P3 533) are derived from information stored in Pre-allocation information/functions (518, 528, 538) including Pre-allocation level (560, 560', 560"), which further optionally includes a function for deriving said pre-allocation from the total available resources for pre-allocation 502. The pre-allocation may be zero or limited to some general minimum value as stored in Pre-allocation minimum level (561, 561', 561"), when the total resources is below a specified level. Alternatively, or additionally, the pre-allocation level (560, 560', 560") may be limited to some maximum value as stored in pre-allocation maximum value (562, 562', 562"). The borrowing and/or preemption priorities for an entity may vary with the total available resources, as indicated by Pre-allocation dependent re-allocation priority function (563, 563', 563") and pre-allocation dependent pre-emption priority function (564, 564', 564"), and may specifically be adjusted when the amount of resources pre-allocated to an entity raises above or falls below pre-determined threshold values as indicated by Pre-allocation level/function (560, 560', 560"). The borrowing costs assign cost components to the borrowing process (i.e., a charge to the borrower and a credit to the donator) via an optional difference function (575, 575', 575") which establishes a difference between said borrower charge and said donator credit, where said borrower charge, donator credit or the difference may optionally may be dependent on the priority level at which a slot is donated, borrowed and/or preempted, the type/mode/direction of the borrowed slot as indicated by Slot type/mode/direction related borrowing costs (574, 574', 574"), and/or the total available resources for pre-allocation 502.

Hence each Entity (A 510, B 520, C 530) has a Donated allocation of slots (D1 515, D2 525, D3 535), respectively, optionally implemented as a vector which separately shows the allocation donated to one or more of the other entities. For example vector D1[2,3] separately shows the allocation slots D1[2] donated by entity A 510 to entity B 520 and the allocation slots D1[3] donated by entity A 510 to entity C 530. Similarly, each entity (A 510, B 520, C530) has a Borrowed allocation of slots (B1 516, B2 526, B3 536), respectively, which once again can be optionally implemented as a vector which separately shows the allocation borrowed from one or more of the other entities. For example, vector B2[1,3] separately shows the allocation slots B2[1] borrowed by entity B 520 from entity A 510 and the allocation slots B2[3] borrowed by entity B 520 from entity C 530. The combination of the pre-allocation, Unused, Donated and Borrowed slots creates a number of used slots from the pre-allocation such as Used Allocation A1 513, A2 523 and A3 533.

For the three entity system of FIG. 5,
A1=P1−U1−D1+B1, A2=P2−U2−D2+B2, A2=P2−U2−D2+B2
A1=A2+A3
SUM{D1,D2,D3}=SUM{B1,B2,B3}

If P1=P2+P3 then the Entity A 510 pre-allocation of timeslots is fully pre-allocated to Entity B 520 and C 530, and neither Entity B 520 or C 530 can borrow from Entity A 510.

If P1>P2+P3 then there remains at Entity A 510 a pre-allocation portion of timeslots (U1+D1) that may be dynamically allocated for HTTP traffic, to entity B 520 and C 530, such that B2[1] may be non-zero and B3[1] may be non-zero, where D1=B2[1]+B3[1].

If P1<P2+P3 then the timeslot proportion at Entity A 510 is overbooked and it is not possible for both Entity B 520 and C 530 to both concurrently employ their full pre-allocation of timeslots. In this case, the resource management process is relying on, for example, the statistics of HTTP traffic arrival events at entity B 520 and C 530 such that one entity can reach its theoretical maximum pre-allocation whilst the other does not concurrently need its full pre-allocation. In this case, for example, Entity B 520 would be using its pre-allocation P2=A2, whilst Entity C 530 would have a Donated allocation D3[1] to entity A 510 such that A3=P3−D3[1]. For A1=A2+A3, this yields A1=P2+P3−D3[1] or P1+B1[3]=P2+P3.

Clearly, with increasing numbers of resource management entities (service classes and subscribers) in multiple levels of hierarchy, the simple equations above become complicated but the principles remain the same. The allocation actually employed by each parent entity in the hierarchy will equal the sum of the allocations actually employed by its directly coupled children. The pre-allocation at the parent entity can be equal, greater than or less than the pre-allocations at the parents dependent children, with the balance provided by timeslots being left unused, donated and/or borrowed. Spare slots may either be unused, or donated up the entity hierarchy (for example via arrow 550) and then borrowed down the entity hierarchy (for example via arrow 551) so that edge entities such as Entity C 530 can get more slots than their pre-allocation when other entities, such as Entity B 520, have spare slots. Note that the donation/borrowing mechanism can alternatively be performed edge to edge (for example via arrow 553), using edge to edge borrowing rules optionally included in borrowing rules & costs 534 that bypass the borrowing rules (also in 534) explicitly associated with the entity hierarchy. This alternative mechanism does not affect the novel borrowing resource and cost tracking aspects of the invention that will now be further described.

The distribution of resources via an entity hierarchy and the donation/borrowing of resources is performed in accordance with various embodiments of the invention. Associating a cost component with at least one of the borrowing mechanisms, the Used, Unused, Donated and Borrowed resources is performed in accordance with various embodiments of the invention. In addition, tracking a chargeable cost component that is a function of at least one of those cost components is performed in accordance with various embodiments of the invention. The cost components and chargeable cost components for the resource management function, e.g., the slot pre-allocation and borrowing/donation processes, are used because they have accounting and billing implications as will now be described in detail. A pre-allocation of resource can generate higher revenue per slot than the best effort dynamic allocation of timeslots, due to the better guarantee of access to resources for specific subscriber and subscriber service classes (e.g., entities) that have been given pre-allocations. If all the resource in a system is pre-allocated, and those allocations are employed, then maximum revenue gain is achieved because the amount of dynamically allocated (i.e., best effort) slots is zero, and the subscribers never experience a situation in which their pre-allocation is not available that might otherwise trigger a rebate. However, in general, a number of factors act to prevent this being achieved. Firstly, the full pre-allocation will not be employed by every subscriber and hence spare slots will still be dynamically available. Secondly, when the access link such as a wireless link has a time varying amount of total available resource as a result of physical conditions, and the number of subscribers per access link varies over time as the subscribers move between wireless cells, then the amount of resource available for pre-allocation and for dynamic allocation is highly variable. If an operator tries to overbook pre-allocations, to reduce the number of dynamically allocated slots, then the operator risks triggering rebates when those pre-allocations are not available (i.e., when the statistics of link capacity, subscriber load and traffic arrival go against the operator). For services and subscribers with unpredictable and/or very bursty arrival statistics, it might be better from a revenue perspective to provide a 'minimum' pre-allocation to each edge entity, and then provide preferential access to overbooked, dynamically allocated spare slots to ensure everyone gets adequate service (no rebates) but some get better service through the use of priority based access to spare slots.

The accounting system can track how various slots are employed in the system to track system costs and system revenue generation efficiency. Use of a pre-allocated slot should be charged at a higher rate than a dynamic slot, and access to dynamic slots based on a priority access system. A suitable cost adjustment to the chargeable cost component, is then determined for the use (or non-use) of pre-allocated slots, dependent on the fate of those slots. For example, FIG. 3 shows that pre-allocated slots have cost components such as RATE slot Cost 378 and NUMBER slot Cost 379, which are adjusted using Unused and Used Slot Costs 376, 377. Dynamically allocated slots, which are borrowed either from a general spare pool or from unused pre-allocated slots, provide additional cost adjustments such as Donated Slot Cost 375 and Borrow Slot Cost 374. The borrowed slot cost could specifically, in some embodiments, be implemented as a table with different Borrow slot costs for different borrowing priority levels, or else multiple individual cost components could be stored for each priority level.

The chargeable cost component, included in Borrowing Rules and Costs 1 514, 2 524 3 534, may and sometimes does include the cost implications of the dynamic variations in the total link capacity, and hence the cost of each pre-allocated and dynamic slot allocated to a subscriber. The link conditions are however different for each subscriber in the cell at the same time (due to radio environment), so this higher capacity is dependent on the link budget (and hence coding gain) for each subscriber at the moment of being allocated a slot. This higher coding gain slot can carry sufficient payload so that the subscriber releases future pre-allocated slots for other subscribers, which should specifically be tracked.

The chargeable cost component cost, included in Borrowing Rules and Costs 1 514, 2 524 3 534, may and sometimes does reward subscribers that release future pre-allocated slots due to above average capacity being achieved in a previous slot, even though they might still consume their agreed amount of service, such as a number of data units or a time of connection, (that is associated with the some notional number of pre-allocated slots at a predicted coding gain).

The chargeable cost component, included in Borrowing Rules and Costs 1 514, 2 524 3 534, may and sometimes does include a cost adjustment (reduction) associated with the number of pre-allocated, pre-charged slots that are Unused.

The chargeable cost component, included in Borrowing Rules and Costs 1 514, 2 524 3 534, includes a cost adjustment (reduction) associated with the number of pre-allocated, pre-charged slots that are donated, said cost adjustment being optionally dependent on the borrowing priority of the borrower.

The chargeable cost component, included in Borrowing Rules and Costs 1 514, 2 524 3 534, includes a cost adjustment (increase) associated with the number of slots borrowed by an entity, said cost adjustment being optionally dependent on the borrowing priority invoked by the borrower to borrow that slot.

Specifically, if the use of pre-allocated slots is charged when each slot in that pre-allocation is used, then the operator risks a revenue shortfall if subscriber traffic is below the agreed amount. Therefore, the chargeable cost component, included in Borrowing Rules and Costs 1 514, 2 524 3 534, for that subscriber can include a slot cost for each unused slot, a smaller slot cost for a donated slot, with the revenue per slot maintained by a slot cost to the borrowing subscriber. Alternatively, if pre-allocated slots are charged whether or not they are used by the allocated subscriber, then the operator could give them a small rebate for spare slots through a reduction in the chargeable cost component. The size of the rebate could be dependent on whether or not those spare slots are borrowed (as tracked by the number of donations), and might further be dependent on the donation/borrowing priority. This is because the borrowing subscriber would themselves be charged for the use of said donated slots and hence would be contributing again to the revenue per slot. Note that in either case, the chargeable cost component would also be taking into account the service payload per slot (i.e. the coding gain) compared to the predicted payload, using the previously mentioned fixed and dynamic cost component inputs.

A further feature of the invention is next described. The access node 110 may, but commonly does not, have the assignment signaling bandwidth to assign a slot to a specific resource management entity at a communications device 101. In addition, even if the slot is assigned to a specific entity, such as Entity B 520, then during the assignment process another entity of higher priority at that communications device 101, such as entity C 530, may accrue packets that require servicing by the next available slot, which it therefore needs to borrow. In either case, the access node 110, cannot accurately track slot the bandwidth being employed by each entity, which therefore undermines the ability of the accounting system to track borrowed slots and the associated costs. Additionally, as has been previously described, there are occasions when the access node 110 is not on the communications path for transmitted data units, i.e. for the sidelink direction, and hence does not have visibility of how assigned slots have been employed. There are also occasions when the access node 110 is on the communications path, as one of the transmitter or a receiver, but is still not sure how slots have been employed. For example, if a transmitted packet was successfully received by a specific communications device 101, if a successfully received packet is actually acceptable to the receiving communications device 101 and hence that the receiver is willing to pay for that packet, and/or to determine for example how many uplink multicast slots it took to get a specific multicast payload to the access node 110.

Therefore, it is apparent that a specific novel embodiment of the tracking of resource/SDU counts, cost components and chargeable costs is to have such information and storage processing located in the communications device 101 so that more accurate information can be tracked, and that information then returned to the access node 110 so that it has complete accounting information for transfer to the accounting server 120.

FIG. 6 therefore shows a specific exemplary embodiment of the invention in which a subscriber, e.g., communications device 101', employing Host 1 601 coupled to Modem 1 640 is further coupled to the communications link 150'. The access node 1 10' is also coupled to the communications link 150' and is composed of at least an access router part 610 and a basestation interface 650 in a single housing. The access node 110' is also coupled to an accounting server 620 via network 699. Communications device 101', access node 110', communications link 150', and accounting server 620 of FIG. 6 may be similar to communications device 101, access node 110, communications link 150, and accounting server 120, respectively, of FIG. 1. Network 699 of FIG. 6 may be similar to the combination of links 161, 163 and node 162 of FIG. 1. An accounting system is implemented using an accounting function 618, 621 that is located in, for example, at least one of the access node 110' and the Accounting Server 620, respectively. In the case of the accounting function 618 in the access node 110', the function can be an accounting proxy function. The communications device 101' includes an accounting function 674 so that it can communicate with the accounting functions 618, 621 in the accounting system for the purposes of exchanging various accounting information now described.

The basestation I/F 650 stores link layer accounting information such as L2 Resource Counts 651, L2 Resource Cost Components 652 and L2 Resource Chargeable Cost Components 653. L2 Resource Counts 651 and cost components 652 can be as described in Access link resource counts 241 and include access link resource information 301 defined in terms of link-layer slots (i.e. frames) and L2 cost components from the System related cost component information 350 such as slot security overhead 360. L2 Chargeable Cost components 653 can be as described for Access link Chargeable Cost Components 250 and include L2 chargeable cost components within Chargeable cost component information 390, such as Sidelink Chargeable Cost component 393.

The access router 610 stores SDU accounting information such as L3 Resource Counts 611, L3 Cost Components 612 and L3 Chargeable Cost Components 613. L3 Resource Counts 611 and Cost Components 612 can be as described in SDU Counts 210 and include access link resource information 301 defined in terms of packets rather than link-layer frames. Each SDU L3 Resource count 611 counts resource consumed by flows that match the SDU service classifier such as SDU classifier 211. The access router 610 can also include L3 Cost components from those described in System related Cost Component information 350 such as IP encapsulation overhead 352. L3 Chargeable Cost Components 613 can be as described in SDU chargeable cost components 220 and include L3 chargeable cost components within Chargeable cost component information 390, such as VPN Chargeable Cost component 396. As has already been described, these counts, cost components and chargeable cost components in the access node 110' can be inaccurate and therefore equivalent resource information is independently tracked in the modem 1 640 and the Host 1 601. Hence modem 1 640 includes L2 Resource Counts 641, L2 Resource Cost Components 642 and L2 Resource Chargeable Cost Components 643, and Host 1 601 includes L3 resource counts 602, L3 Cost components 603 and L3 chargeable cost components 604. As has been previously described resource counts, e.g., L3 602 and L2 641 resource counts in the end node, count resources associated with flows that are defined by SDU and/or access link resource classifiers 211, 248. The relationship between L2 and L3 counts, cost components and chargeable cost components for such flows or flow groups are defined for example by mapping information 217, 218, 224. L2 Information 641, 642, 643 can be communicated using a novel accounting/tracking protocol 661 to the accounting system such as via the basestation I/F 650, and then merged with the equivalent information 651, 652, 653 to provide a complete or at least more accurate record of usage of L2 resources of the communications link 150'. Additionally or alternatively, L3 information 602, 603, 604 can be communicated using a novel accounting/tracking protocol 662 to the accounting system such as via the access router 610 and then merged with the equivalent information 611, 612, 613 to provide a complete or at least more accurate record of packet usage of the communications link 150'.

The Access node 110' and communications device 101' can further include Unit reception Rules 657, 647, respectively, which defines which data units such as slots and packets are and/or are not acceptable for reception over the access link 150' such that data units received which are not acceptable, are dropped in the modem 1 640 or basestation I/F 650 and at least one of the resource counts, costs and chargeable costs 641, 642, 643, 651, 652, 653 modified to reflect that drop as compared to an embodiment that does not have Unit Reception rules 657, 647. The unit reception rules 657, 647 will typically be implemented as a list of at least one flow classifier that can describe flows that are acceptable for reception and/or flows that are not acceptable for reception. Note that whilst Unit reception rules 657, 647 act on received packets they can also clearly be used to prevent such Units being transmitted from the transmitter at the other end of the access link 150', when its Unit reception rules include information that matches the receivers rule set. Unit reception rules 647, 657 could be implemented in a link-layer firewall function in the modem/basestation I/F as shown in FIG. 6, or alternatively integrated as part of the IP packet firewall in the access router/Host. In a further inventive step, either one or both of the accounting tracking protocols 661, 662 can synchronize Unit Reception rules between the access node 110' and the communications device 101'. Unit reception rules can be communicated from the communications device 101' to the access node 110' or Unit reception rules can be received at the communications device 101' from the access node 110'. This avoids Units being received that will be then dropped, and hence avoids wasting resources on the communications link 150'.

Considering next the tracking of the borrowing of resources such as L3 SDU bandwidth or L2 slots, for two entities B and C, where each entity is a subscriber specific service class (i.e., an allocation for VoIP and an allocation for HTTP traffic) and hence associated with a single communications device 101'. The entity classifier may be implemented as a flow classifier that describes at least one flow of data units in terms of the values of the header and payload fields in those data units, that belong to that entity, and hence that can consume resources allocated to that entity. The basestation will be making assignments to the modem 1 for the unicast uplink slots on the access link 150', for example, but could be for other types and modes of slots in the uplink direction. These link-layer (L2) slots equate to an amount of (L3) bandwidth at the IP layer, which fluctuates with physical conditions. The access router 610 would like to accumulate information on how those assigned slots are employed, so for example how much allocated bandwidth was used and unused by entity B, stored in B USED count 614 and B UNUSED count 615. The access router also would like to know, for example, how much bandwidth was donated by entity B and borrowed by entity C, stored as C Borrowed 616 and B Donated 617. At the link-layer (basestation) interface 650, equivalent parameters could be maintained for slot borrowing such as C Borrowed Slots 656 and B Donated Slots 655. Specifically, the basestation I/F 650 includes Slot Assignment (i.e., allocation) information 654 but cannot know how these assigned slots are actually used given the multiple entities at the communications device 101' and the ability of that communications device scheduler to borrow/donate assigned slots between service class entities B and C. Further, the access node 110' might need to know how a particular resource was borrowed in terms of the relative and/or absolute reallocation and or preemption priority levels of the resource entities involved in the reallocation process. This is particularly important if these affect the cost, and hence the subsequent chargeable cost component and charge associated with the resource usage by the communications device 101'.

Once again therefore, equivalent information is stored at the other end of the access link 150' as L3 Borrowing Counts and priorities 606, L3 Borrowing Costs and L3 Borrowing Rules 605, L2 Borrowing Counts and priorities 645, L2 Borrowing Costs 646 and L2 Borrowing Rules 644, the Borrowing rules 644,605 specifically including information on the pre-allocations (i.e., Quality of Service targets) of slots/data units for each of entities B and C, as well as how and when borrowing is allowed between them, and any other service class entities at the communications device 101'. In addition, the borrowing rules 605, 644 optionally include; i) reallocation borrowing priority levels for at least two entities that controls the order of access to spare resources by those entities when they are exceeding its pre-allocation and ii) preemption reallocation priority levels for at least two entities that controls whether one of those entities, that has exceeded its pre-allocation, can preempt resources that are not spare from the other entity. The borrowing rules 605, 644 may further include functions that enable the relative reallocation and preemption priority levels involved in a borrowing act to be converted into an appropriate value in borrowing cost 607,646, and this priority information can also be tracked alongside the borrowing resource counts in L3, L2 Borrowing Counts and Priorities 606,645 so that the accounting system can take account of the priority level information when generating a charge for the total resource usage by the communications device 101'. The access node 110' then tracks resources assigned and slots/data units received and for some of them can maintain a view of subsets of borrowing activity. Meanwhile, the actual borrowing activity, including borrowing counts and priorities 606,645 and their impact on the chargeable cost components 604,643 is tracked at the communications device 101', and is then communicated in either or both accounting tracking protocols 661, 662 so that the information can be merged with information 651, 652, 653, 611, 612, 613 and specifically produce accurate values in information elements 614, 615, 616, 617, 656, 655, 654 which are specific examples of tracked information for the borrowing process described in FIG. 5, with associated information elements described in FIGS. 2 and 3.

In a further inventive step, the borrowing rules & Costs 605, 644 (e.g., cost algorithms) are either communicated from the access node 110' to the communications device 101' and accepted by the communications device 101', communicated from the communications device 101' to the access node 110' and accepted by that access node 110', or negotiated between the access node 110' and the communications device 101' during attachment. Alternatively, at least one of the borrowing rules 605,644, the Unit reception Rules 647 and the fixed cost component information stored in Resource cost components 642,603 are pre-programmed, configured using a management protocol or programmed via driver software on the modem 1 640 or Host 1 601.

The communications device 101' can alternatively or additionally, maintain its own accounting records at a variety of visited access nodes such as access node 110', and then later report these records to its home AAA server via an access node in its home domain. This is particularly useful when two domains have a billing relationship but do not have accounting server connectivity (e.g., using RADIUS PROXY), or such connectivity would be too expensive to transport accounting records generated at each visited access node such as 110' in that visited domain. The Home accounting/billing system then recompenses those visited domains for accounting records accumulated at the access nodes of that visited domain.

In the next inventive step, the Host 1 601 includes L3 Account records 670 which further includes an L3 record for operator X 671, identified by an operator X identifier. The record 671 stores accounting records generated at visited access nodes from or for that operator X relating to services provided to a subscriber using the communications device. Host 1 601 further includes an L3 account record for another operator Y 672, identified by an operator Y identifier. The record 672 stores accounting records generated at visited access nodes from that operator Y. L3 Account records 670 also includes account state for home operator Z 673, identified by a home operator Z identifier, which is associated with the home operator of the communications device 101' and further includes instructions for storing account records from other operators such as X and Y, and for transferring those accounting records to the home operator accounting system. Account state for home operator Z 673 further optionally includes security and access control information 674, e.g., encryption information such as a secure key, that enables the operator to protect the account records 671,672 and 673 from being tampered with, although the subscriber (i.e. user of modem 1 640 and/or Host 1 601) may be allowed to view its account record history without altering the history which may be used by the operator for bill generation.

In the next inventive step, the Modem 1 640 includes L2 Account records 680 which further includes an L2 record for operator X 681. Modem 1 640 also stores accounting records generated at visited access nodes from that operator X, and an L2 account record for operator Y 682, which is used to store accounting records generated at visited access nodes from operator Y. Persistent L2 account records further include account state for operator Z 683 which is the home operator of the communications device 101' and hence includes, in some embodiments, instructions for storing account records from other operators such as X and Y, and for transferring those accounting records to the home operator accounting system. Account state for home operator Z 683 further optionally includes security and access control information 684 that enable the L2 account records 681 and 682 to be protected from being tampered with, although the subscriber may be allowed to view its account record history.

The L3 and L2 account records 670, 680 will typically be stored in persistent, and optionally removable, media so that power failures will not result in the loss of such records and so that accounting records may be removed and transferred into other communications devices.

In contrast to resource schedulers and/or other devices which may track some of the resources discussed herein, e.g., for resource scheduling purposes, the access node, end node and/or other device of the present invention which tracks resource utilization information in accordance with the invention normally maintains the tracked information for periods of time far longer than is done in the case of a resource allocation scheduler. For example, the device of the invention may track, accumulate and maintain such information in memory for seconds, minutes, hours, days, weeks or even months prior to reporting such information to an accounting system for use in generation of a bill or for other reasons. Thus, in some embodiments tracked resource utilization information is stored and maintained for 10 or more seconds in memory or in data storage device.

Messages may be stored in a physical machine readable medium such as a hard disk, memory or other storage device as a collection of bits located as a unit in said machine readable medium. Fields within said messages may be stored as adjacent sets of bits in the storage medium. Messages generated and communicated in accordance with the invention are stored, e.g., temporarily, in buffers and/or other memory implemented as a physical machine readable medium used to store the message. Software modules may also be stored in the physical machine readable memory.

Various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s). Messages which are generated and/or transmitted in accordance with the invention are stored on machine readable medium, e.g., in memory (RAM) in the device generating, transmitting and/or receiving the message or messages. The present invention is directed to, among other things, memory storing the novel messages of the present invention.

Numerous additional variations on the methods and apparatus of the present invention described above will be apparent to those skilled in the art in view of the above description of the invention. Such variations are to be considered within the scope of the invention. The methods and apparatus of the present invention may be used with CDMA, orthogonal frequency division multiplexing (OFDM), or various other types of communications techniques which may be used to provide wireless communications links between access nodes such as base stations, access routers and mobile nodes. Accordingly, in some embodiments base stations establish communications links with mobile nodes using OFDM or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A method operational on an access node in a communications system which includes a plurality of users and different sets of pre-allocated resources, a first user being assigned to use resources from a first one of said sets of pre-allocated resources, the method comprising:
   determining, on the access node, when said first user requires resources for a communications service exceeding the pre-allocated resources assigned to said first user;
   in response to determining that said first user requires resources exceeding the pre-allocated resources assigned to said first user, the access node provides reallocated resources to said first user from a second set of pre-allocated resources;
   crediting a second user for at least a portion of said reallocated resources; and
   charging said first user for at least a portion of said reallocated resource.

2. The method of claim 1, wherein at least some of said reallocated resources are from a resource pool from which said second user is entitled to allocation of a preselected portion of said pool resources.

3. The method of claim 1, wherein said second user is entitled to allocation of a pre-selected portion of said second set of pre-allocated resources.

4. The method of claim 1, wherein at least some of said reallocated resources are from a resource pool to which said second user is entitled to dynamic allocation of pool resources.

5. The method of claim 1, wherein said second user is entitled to dynamic allocation of resources from said second set of pre-allocated resources.

6. The method of claim 1, wherein at least some of said reallocated resources were pre-allocated to said second user.

7. The method of claim 6, wherein said second user is credited an amount for said reallocated resources which is different from the amount charged to said first user for said reallocated resource.

8. The method of claim 6, wherein said reallocated resources include a timeslot and said difference in the amount charged to the first user and credited to the second user is a function of at least one of: a timeslot type, a time slot mode and a time slot direction.

9. The method of claim 1, where a first priority level is associated with said first user, said first priority level indicating a priority level assigned to said first user for determining the first user's right to be provided reallocated resources from the second set of pre-allocated resources, relative to a reallocation priority level assigned to at least one other user that has exceeded its pre-allocated resources.

10. The method of claim 9, where said reallocated resources were pre-allocated to the second user; wherein said second user is credited an amount for said reallocated resources which is different from the amount charged to said first user for said reallocated resource; and wherein the difference between the amount charged to said first user and credited to said second user is determined as a function of at least a priority level associated with one of said first and second users.

11. The method of claim 10, where said difference between the charged and credited amounts is determined as a function of a priority level difference between the first priority level associated with said first user and a reallocation priority level associated with said second user.

12. The method of claim 9, wherein said second user is credited an amount for said reallocated resources which is different from the amount charged to said first user for said reallocated resource; where said difference is determined as a function of a reallocation priority level of the first user, and a reallocation level of at least one other user that is competing to use said second user's pre-allocated resource.

13. The method of claim 12, where said difference is determined as a function of the most important reallocation priority level assigned to at least one other user competing to use said second user's pre-allocated resource, said most important other reallocation priority level being one of; less than or as equal to the reallocation priority level of the first user.

14. The method of claim 2, wherein said pre-allocated resource that is reallocated to said first user would not have been used by said second user.

15. The method of claim 14, wherein said amount of credit given to the second user is less than the amount of credit that would have been given to the second user if said second user was going to use said reallocated resources.

16. The method of claim 7, wherein said pre-allocated resource that is reallocated to said first user would have been used by said second user.

17. The method of claim 16, wherein said difference between the amount credited to the second user and charged to the first user is also a function of a first pre-emption priority level assigned to the first user and a second pre-emption priority level assigned to said second user.

18. The method of claim 1, wherein said at least some of said reallocated resources are a first portion of resources pre-allocated to said second user, the method further comprising: charging said second user for a second portion of pre-allocated resources which go unused in said system.

19. The method of claim 1, wherein at least some of said reallocated resources are a first portion of resources pre-allocated to said second user, the method further comprising: charging said second user for the amount of resources pre-allocated to the second user in said system; and providing said second user with at least a partial credit for at least some of said resources that were pre-allocated to said second user when said at least some resources are: either reallocated to another user or go unused by any user.

20. The method of claim 6, wherein the pre-allocated resources to at least one of said first and second users is a portion of bandwidth on a wireless communications link, the bandwidth of said communications link varying as a function of physical conditions thereby resulting in varying amounts of pre-allocated bandwidth to said at least one of said first and second users.

21. The method of claim 6, further comprising: operating an access node to determine the amount of pre-allocated resources assigned to at least one of said first and second users available at a particular point in time as a function of a determined physical condition which can vary over time affecting the amount of pre-al located resources which are available.

22. The method of claim 21, wherein the amount of pre-allocated resource to another of said first and second users is fixed.

23. The method of claim 9, wherein the pre-allocated resources to at least one of said first and second users is a portion of bandwidth on a wireless communications link, the bandwidth of said communications link varying as a function of physical conditions thereby resulting in varying amounts of pre-allocated resources to said at least one of said first and second users, the method further comprising:

increasing a reallocation priority level to at least one of said first and second users when the amount of pre-allocated resource drops below a pre-determined level.

24. The method of claim 1, wherein the pre-allocated resources to said first user is a portion of bandwidth on a wireless communications link, the bandwidth of said communications link varying as a function of physical conditions, wherein said portion is zero when the bandwidth of said communications link is below a pre-determined level.

25. The method of claim 1, further comprising: providing a credit to said first user for releasing a resource that is pre-allocated to said first user, so that it is available to be used by another user.

26. The method of claim 25, wherein said first user releases said pre-allocated resource prior to a time at which said resource would have been scheduled for dynamic reallocation in said communications system.

27. An access node having different sets of pre-allocated resources wherein a first user being assigned to use resources from a first one of said sets of pre-allocated resources, the access node comprising:

means for determining, on the access node, when said first user requires resources for a communications service exceeding the pre-allocated resources assigned to said first user;

means for reallocating resources to said first user from a second set of pre-allocated resources in response to a determination that said first user requires resources exceeding the pre-allocated resources assigned to the first user;

means for crediting a second user for at least a portion of said reallocated resources; and means for charging said first user for at least a portion of said reallocated resource.

28. The access node of claim 27, wherein said means for crediting a second user credits an amount for said reallocated resources which is different from the amount charged to said first user for said reallocated resource.

29. A method operational on an access node in a communications system which includes a plurality of users and different sets of pre-allocated resources, a first user being assigned to use resources from a first one of said sets of pre-allocated resources, the method comprising:

determining, on the access node, when said first user requires resources for a communications service exceeding the pre-allocated resources available to said first user;

in response to determining that said first user requires resources exceeding the pre-allocated resources available to said first user, the access node provides reallocated resources to said first user from a second set of pre-allocated resources;

generating a first chargeable cost component for said first user as a function of at least a first portion of said reallocated resources; and generating a second chargeable cost component for said second user as a function of at least a second portion of said reallocated resources.

30. The method of claim 29, further comprising: generating a charge for said first user as a function of said first chargeable cost component.

31. The method of claim 29, further comprising: generating a charge for said second user as a function of said second chargeable cost component.

32. The method of claim 29, further comprising: generating, for one of said first and second users a charge as a function of both of said first and second chargeable cost components.

33. The method of claim 1, wherein a portion of said first chargeable cost component attributable to said reallocated resources is different from a portion of said second chargeable cost component attributable to said reallocated resources.

34. A processor readable medium having one or more instructions operational on an access node for providing pre-allocated resources to a plurality of users; which when executed by a processor causes the processor to:

determine, on the access node, when a first user requires resources for a communications service exceeding the pre-allocated resources assigned to said first user;

in response to determining that said first user requires resources exceeding the pre-allocated resources assigned to said first user, the access node provides reallocated resources to said first user from a second set of pre-allocated resources;

credit a second user for at least a portion of said reallocated resources; and charge said first user for at least a portion of said reallocated resource.

35. A processor operational in an access node, the processor comprising:

a processing circuit, operational in the access node, configured to determine when a first user requires resources for a communications service exceeding the pre-allocated resources assigned to said first user;

in response to determining that said first user requires resources exceeding the pre-allocated resources assigned to said first user, provide reallocated resources to said first user from a second set of pre-allocated resources;

credit a second user for at least a portion of said reallocated resources; and charge said first user for at least a portion of said reallocated resource.

36. An access node, comprising:

a communication interface for communication with a communications device;

a processing circuit coupled to the communication interface, the processing circuit operational in the access node configured to:

determine when a first user requires resources for a communications service exceeding the pre-allocated resources assigned to said first user;

in response to determining that said first user requires resources exceeding the pre-allocated resources assigned to said first user, provide reallocated resources to said first user from a second set of pre-allocated resources;

credit a second user for at least a portion of said reallocated resources; and charge said first user for at least a portion of said reallocated resource.

* * * * *

UNITED STATES PATENT AND TRADEMARK OFFICE
CERTIFICATE OF CORRECTION

PATENT NO. : 7,616,746 B2 Page 1 of 1
APPLICATION NO. : 10/918283
DATED : November 10, 2009
INVENTOR(S) : Alan O'Neill It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1402 days.

Signed and Sealed this

Nineteenth Day of October, 2010

David J. Kappos
*Director of the United States Patent and Trademark Office*